US012701515B2

(12) United States Patent
    Liu et al.

(10) Patent No.: US 12,701,515 B2
(45) Date of Patent: *Aug. 4, 2026

(54) SYSTEM AND METHOD FOR WIRELESS POWER CONTROL

(71) Applicant: Futurewei Technologies, Inc., Addison, TX (US)

(72) Inventors: Jialing Liu, Palatine, IL (US); Weimin Xiao, Hoffman Estates, IL (US); Qian Cheng, Naperville, IL (US)

(73) Assignee: FUTUREWEI TECHNOLOGIES, INC., Addison, TX (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/593,676

(22) Filed: Mar. 1, 2024

(65) Prior Publication Data

US 2024/0276388 A1    Aug. 15, 2024

Related U.S. Application Data

(63) Continuation of application No. 17/724,292, filed on Apr. 19, 2022, now Pat. No. 11,924,772, which is a
                    (Continued)

(51) Int. Cl.
    *H04W 52/00*        (2009.01)
    *H04W 52/08*        (2009.01)
                    (Continued)
(52) U.S. Cl.
    CPC ......... *H04W 52/146* (2013.01); *H04W 52/08* (2013.01); *H04W 52/10* (2013.01);
                    (Continued)
(58) Field of Classification Search
    CPC ... H04W 52/146; H04W 52/08; H04W 52/10; H04W 52/241; H04W 52/242;
                    (Continued)

(56) References Cited

U.S. PATENT DOCUMENTS 7,899,486 B2    3/2011  You et al.
8,706,152 B2    4/2014  Seo et al.
                (Continued)

FOREIGN PATENT DOCUMENTS

CA        2932387 A1      5/2013
CN      101835253 A      9/2010
                (Continued)

OTHER PUBLICATIONS

Nokia, "UL Power Control for MIMO," 3GPP TSG HAN WG1 Meeting #89, R1-1708220, 6 pages.
                (Continued)

*Primary Examiner* — Md K Talukder

(74) *Attorney, Agent, or Firm* — Slater Matsil, LLP

(57)            ABSTRACT

A method for operating a user equipment (UE) includes receiving at least one of a configuration of a first group of one or more downlink (DL) signals, a configuration of a second group of one or more open-loop power control (PC) parameters, a configuration of a third group of one or more closed-loop PC parameters, or a configuration of a fourth group of one or more loop states, receiving a configuration of a PC setting, wherein the PC setting is associated with at least one of a subset of the first group, a subset of the second group, a subset of the third group, or a subset of the fourth group, selecting a transmit power level in accordance with the PC setting and a pathloss, wherein the pathloss is determined in accordance with a DL reference signal (SS) and a synchronization signal (SS).

24 Claims, 13 Drawing Sheets

Related U.S. Application Data continuation of application No. 16/872,975, filed on May 12, 2020, now Pat. No. 11,317,355, which is a continuation of application No. 16/538,331, filed on Aug. 12, 2019, now Pat. No. 10,694,472, which is a continuation of application No. 15/977,872, filed on May 11, 2018, now Pat. No. 10,425,900.

(60) Provisional application No. 62/558,190, filed on Sep. 13, 2017, provisional application No. 62/506,435, filed on May 15, 2017.

(51) Int. Cl.

| *H04W 52/10* | (2009.01) |
|---|---|
| *H04W 52/14* | (2009.01) |
| *H04W 52/24* | (2009.01) |
| *H04W 72/23* | (2023.01) |
| *H04W 52/50* | (2009.01) |
| *H04W 72/044* | (2023.01) |

(52) U.S. Cl.
CPC ....... *H04W 52/241* (2013.01); *H04W 52/242* (2013.01); *H04W 52/245* (2013.01); *H04W 72/23* (2023.01); *H04W 52/50* (2013.01); *H04W 72/0473* (2013.01)

(58) Field of Classification Search
CPC ... H04W 52/245; H04W 72/23; H04W 52/50; H04W 72/0473
See application file for complete search history.

(56) References Cited

U.S. PATENT DOCUMENTS

| 9,144,040 | B2 | 9/2015 | Xiao |
|---|---|---|---|
| 9,204,407 | B2 | 12/2015 | Dinan |
| 9,397,875 | B2 | 7/2016 | Dinan |
| 9,642,099 | B2 | 5/2017 | Bagheri et al. |
| 9,844,005 | B2 | 12/2017 | Ouchi et al. |
| 10,425,900 | B2 | 9/2019 | Liu et al. |
| 10,694,472 | B2 | 6/2020 | Liu et al. |
| 11,317,355 | B2 | 4/2022 | Liu et al. |
| 2003/0068984 | A1 | 4/2003 | Shin et al. |
| 2006/0035660 | A1 | 2/2006 | Anderson |
| 2011/0021232 | A1 | 1/2011 | Kazmi et al. |
| 2011/0105059 | A1 | 5/2011 | Gaal et al. |
| 2011/0243007 | A1 | 10/2011 | Xiao |
| 2012/0213128 | A1 | 8/2012 | Miyata |
| 2013/0295979 | A1 | 11/2013 | Shin et al. |
| 2014/0036737 | A1 | 2/2014 | Ekpenyong et al. |
| 2014/0126530 | A1* | 5/2014 | Siomina ................ H04L 5/0073 370/330 |
| 2014/0169361 | A1 | 6/2014 | Kim et al. |
| 2014/0219152 | A1* | 8/2014 | Anto ................... H04W 52/244 370/311 |
| 2014/0269454 | A1 | 9/2014 | Papasakellariou |
| 2014/0286219 | A1 | 9/2014 | Siomina et al. |
| 2015/0009913 | A1 | 1/2015 | Lee et al. |
| 2015/0063317 | A1 | 3/2015 | Park et al. |
| 2015/0156754 | A1 | 6/2015 | Xu et al. |
| 2015/0195793 | A1 | 7/2015 | Shin et al. |
| 2015/0245368 | A1 | 8/2015 | Nukala et al. |
| 2015/0257167 | A1 | 9/2015 | Chen et al. |
| 2015/0263839 | A1 | 9/2015 | He et al. |
| 2015/0358924 | A1* | 12/2015 | Papasakellariou .. H04W 52/346 370/329 |
| 2016/0035344 | A1 | 2/2016 | Gonzalez-Dominguez et al. |
| 2016/0066281 | A1 | 3/2016 | Ouchi et al. |
| 2016/0081033 | A1 | 3/2016 | Ouchi et al. |
| 2016/0150486 | A1* | 5/2016 | Park ..................... H04W 52/34 455/422.1 |
| 2016/0150490 | A1 | 5/2016 | Ouchi et al. |
| 2016/0183203 | A1* | 6/2016 | Larsson .............. H04W 52/365 370/329 |

| 2016/0255649 | A1 | 9/2016 | Kusashima et al. |
|---|---|---|---|
| 2016/0270060 | A1 | 9/2016 | Kusashima |
| 2016/0277162 | A1 | 9/2016 | Dinan |
| 2016/0353440 | A1* | 12/2016 | Lee ...................... H04W 72/53 |
| 2016/0353450 | A1 | 12/2016 | Miao |
| 2016/0353500 | A1 | 12/2016 | Choi et al. |
| 2017/0141893 | A1 | 5/2017 | Zhang |
| 2017/0223676 | A1 | 8/2017 | Dinan et al. |
| 2017/0245220 | A1 | 8/2017 | Ouchi et al. |
| 2017/0302419 | A1 | 10/2017 | Liu et al. |
| 2017/0353932 | A1 | 12/2017 | Sorrentino et al. |
| 2018/0014257 | A1 | 1/2018 | Ouchi et al. |
| 2018/0083680 | A1 | 3/2018 | Guo et al. |
| 2018/0110084 | A1 | 4/2018 | Dinan et al. |
| 2018/0310257 | A1 | 10/2018 | Papasakellariou |
| 2018/0332540 | A1 | 11/2018 | Lou et al. |
| 2018/0332541 | A1 | 11/2018 | Liu et al. |
| 2019/0191381 | A1 | 6/2019 | Zhang et al. |
| 2019/0191444 | A1 | 6/2019 | Park et al. |
| 2019/0335400 | A1 | 10/2019 | Gong et al. |
| 2019/0373559 | A1 | 12/2019 | Davydov et al. |
| 2020/0178180 | A1 | 6/2020 | Zhang et al. |
| 2021/0045062 | A1 | 2/2021 | Ryu et al. |
| 2021/0076335 | A1 | 3/2021 | Deenoo et al. |
| 2021/0289446 | A1 | 9/2021 | Davydov et al. |
| 2024/0276388 | A1* | 8/2024 | Liu ...................... H04W 72/23 |

FOREIGN PATENT DOCUMENTS

| CN | 102308640 | A | 1/2012 |
|---|---|---|---|
| CN | 102395184 | A | 3/2012 |
| CN | 103718623 | A | 4/2014 |
| CN | 103813429 | A | 5/2014 |
| CN | 103843423 | A | 6/2014 |
| CN | 103974399 | A | 8/2014 |
| CN | 104067675 | A | 9/2014 |
| CN | 104904150 | A | 9/2015 |
| CN | 105191440 | A | 12/2015 |
| CN | 105264973 | A | 1/2016 |
| EP | 2323450 | A2 | 5/2011 |
| JP | 2010531579 | A | 9/2010 |
| JP | 2013070405 | A | 4/2013 |
| JP | 2015139101 | A | 7/2015 |
| JP | 2016521512 | A | 7/2016 |
| JP | 2018530228 | A | 10/2018 |
| WO | 2004045228 | A1 | 5/2004 |
| WO | 2008157797 | A3 | 5/2009 |
| WO | 2014179979 | A1 | 11/2014 |
| WO | 2017044696 | A1 | 3/2017 |

OTHER PUBLICATIONS

"3rd Generation Partnership Project; Technical Specification Group Radio Access Network; Evolved Universal Terrestrial Radio Access (E-UTRA); User Equipment (UE) radio and transmission and reception (Release 14)," 3GPP TS 36.101 V14.3.0, Mar. 2017, 1369 pages.

"3rd Generation Partnership Project; Technical Specification Group Radio Access Network; Evolved Universal Terrestrial Radio Access (E-UTRA); User Equipment (UE) radio transmission and reception (Release 14)," 3GPP TS 36.101 V14.5.0, Sep. 2017, 1509 pages.

"3rd Generation Partnership Project; Technical Specification Group Radio Access Network; Evolved Universal Terrestrial Radio Access (E-UTRA); User Equipment (UE) radio transmission and reception (Release 15)," 3GPP TS 36.101, V15.2.0, Mar. 2018, 1625 pages.

"3rd Generation Partnership Project; Technical Specification Group Radio Access Network; Evolved Universal Terrestrial Radio Access (E-UTRA); Physical channels and modulation (Release 11)," 3GPP TS 36.211 V11.7.0, Mar. 2017, 120 pages.

"3rd Generation Partbership Project; Technical Specification Group Radio Access Network; Evolved Universal Terrestrial Radio Access (E-UTRA); Physical layer procedures (Release 11)," 3GPP TS 36.213 V 11.13.0, Sep. 2017, 184 pages.

"3rd Generation Partnership Project; Technical Specification Group Radio Access Network; Evolved Universal Terrestrial Radio Access

(56) References Cited

OTHER PUBLICATIONS (E-UTRA); Physical layer procedures (Release 15)," 3GPP TS 36.213, V15.1.0, Mar. 2018, 495 pages.

"3rd Generation Partnership Project; Technical Specification Group Radio Access Network; NR; User Equipment (UE) radio transmission and reception;I, (Release 15)," 3GPP TS 38.101-1 V15.1.0, Mar. 2018, 71 pages.

"3rd Generation Partnership Project; Technical Specification Group Radio Access Network; NR; User Equipment (UE) radio transmission and reception; Part 2: Rance 2 Standalone (Release 15)," 3GPP TS 38.101-2, V15.1.0, Mar. 2018, 46 pages.

"3rd Generation Partnership Project; Technical Specification Group Radio Access Network; NR; User Equipment (UE) radion transmission and reception; Part 3: Range 1 and Range 2 Interworking operation with other radios (Release 15)," 3GPP TS 38.101-2, V15.1.0, Mar. 2018, 78 pages.

"3rd Generation Partnership Project; Technical Specification Group Radio Access Network; NR; Physical channels and modulation (Release 15)," 3GPP TS 38.211 V15.0.0, Dec. 2017, 73 pages.

"3rd Generation Partnership Project; Technical Specification Group Radio Access Network; NR Physical layer procedures for control (Release 15)," 3GPP TS 38.213 V15.0.0, Dec. 2017, 56 pages.

"3rd Generation Partnership Project; Technical Specification Group Radio Access Network; NR; Physical layer procedures for control, (Release 15)," 3GPP TS 38.213, V15.1.0, Mar. 2018, 77 pages.

"3rd Generation Partnership Project; Technical Specification Group Radio Access Network; NR; Radio Resource Control (RRC) protocol specification (Release 15)," 3GPP TS 38.331, V15.1.0, Mar. 2018, 268 pages.

Intel Corporation, "Discussion On UL Power Control for Data Channel", 3GPP TSG-RAN WG1 #89, R1-1707422, May 15-19, 2017, 6 Pages, Hangzhou, China.

Nokia et al., "UL Power Control of MIMO", 3GPP TSG RAN WG1 Meeting #89, R1-1708220, May 15-19, 2017, 7 Pages, Hangzhou, P.R., China.

LG Electronics, "Discussion on UL transmit power control for NR," 3GPP TSG RAN WG1 NR Ad-Hoc Meeting, R1-1700492, Spokane, USA, Jan. 16-20, 2017, 5 pages.

NTT DOCOMO, "New SID Proposal: Study on New radio Access Techonology," 3GPP TSG RAN Meeting #71, RP-160671, Agenda Item 9.1, Goetebord, Sweden, Mar. 7-10, 2016, 8 pages.

* cited by examiner

UPLINK CONNECTION

DOWNLINK CONNECTION

400

- eNB CONFIGURES PUSCH FOR CC 405
  - CONFIGURE PC FOR SIGNAL
    - ALPHA, P0, OPTIONALLY TPC RESOURCES AND RNTI (E.G., SPS)
    - ALPHA, P0, OPTIONALLY TPC RESOURCES AND RNTI (E.G., TRIGGERED)
    - ...

- eNB CONFIGURES PUCCH FOR A CC 410
  - CONFIGURE PC FOR SIGNAL
    - P0, OPTIONALLY TPC RESOURCES AND RNTI
  - ...
- TPC RESOURCES AND RNTI MAY BE IMPLICIT IN DCI GRANTS 415
- PATHLOSS DOES NOT REQUIRE CONFIGURATION 420

Figure 5:
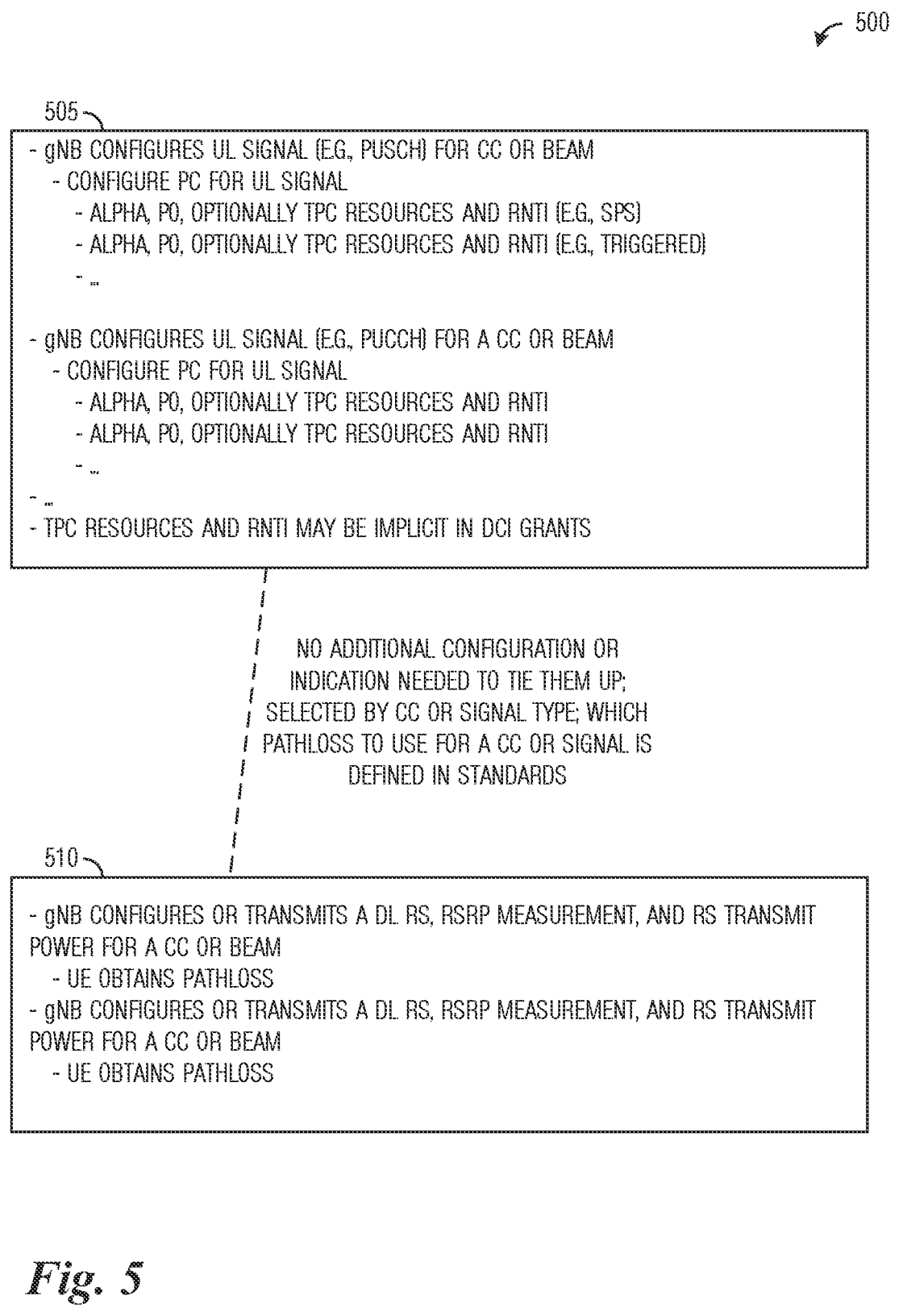

500

505

- gNB CONFIGURES UL SIGNAL (E.G., PUSCH) FOR CC OR BEAM
  - CONFIGURE PC FOR UL SIGNAL
    - ALPHA, P0, OPTIONALLY TPC RESOURCES AND RNTI (E.G., SPS)
    - ALPHA, P0, OPTIONALLY TPC RESOURCES AND RNTI (E.G., TRIGGERED)
    - ...

- gNB CONFIGURES UL SIGNAL (E.G., PUCCH) FOR A CC OR BEAM
  - CONFIGURE PC FOR UL SIGNAL
    - ALPHA, P0, OPTIONALLY TPC RESOURCES AND RNTI
    - ALPHA, P0, OPTIONALLY TPC RESOURCES AND RNTI
    - ...
- ...
- TPC RESOURCES AND RNTI MAY BE IMPLICIT IN DCI GRANTS

NO ADDITIONAL CONFIGURATION OR
INDICATION NEEDED TO TIE THEM UP;
SELECTED BY CC OR SIGNAL TYPE; WHICH
PATHLOSS TO USE FOR A CC OR SIGNAL IS
DEFINED IN STANDARDS

510

- gNB CONFIGURES OR TRANSMITS A DL RS, RSRP MEASUREMENT, AND RS TRANSMIT POWER FOR A CC OR BEAM
  - UE OBTAINS PATHLOSS
- gNB CONFIGURES OR TRANSMITS A DL RS, RSRP MEASUREMENT, AND RS TRANSMIT POWER FOR A CC OR BEAM
  - UE OBTAINS PATHLOSS

Figure 6:
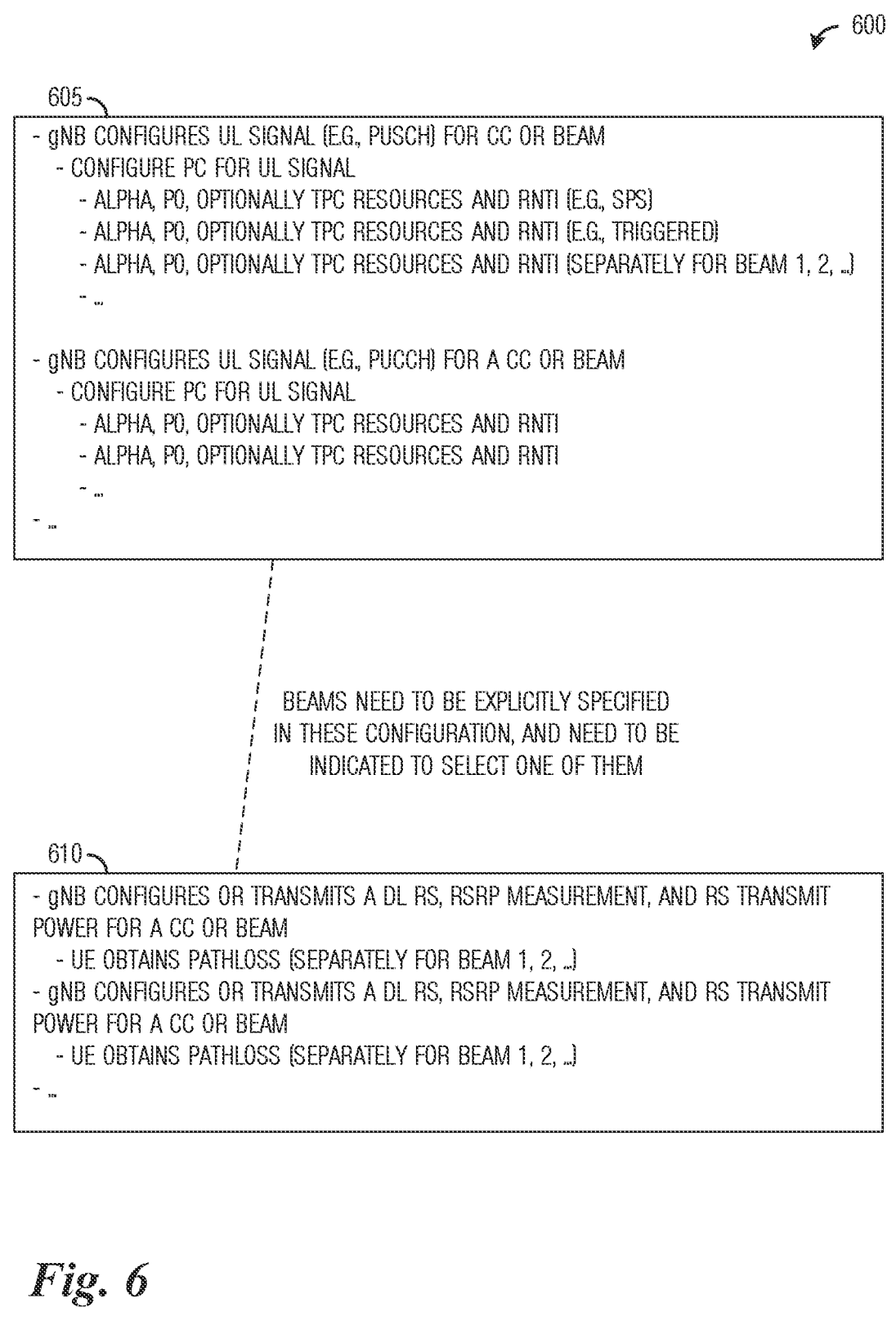

- gNB CONFIGURES UL SIGNAL (E.G., PUSCH) FOR CC OR BEAM
  - CONFIGURE PC FOR UL SIGNAL
    - ALPHA, PO, OPTIONALLY TPC RESOURCES AND RNTI (E.G., SPS)
    - ALPHA, PO, OPTIONALLY TPC RESOURCES AND RNTI (E.G., TRIGGERED)
    - ALPHA, PO, OPTIONALLY TPC RESOURCES AND RNTI (SEPARATELY FOR BEAM 1, 2, ...)
    - ...

- gNB CONFIGURES UL SIGNAL (E.G., PUCCH) FOR A CC OR BEAM
  - CONFIGURE PC FOR UL SIGNAL
    - ALPHA, PO, OPTIONALLY TPC RESOURCES AND RNTI
    - ALPHA, PO, OPTIONALLY TPC RESOURCES AND RNTI
    - ...

- ...

BEAMS NEED TO BE EXPLICITLY SPECIFIED
IN THESE CONFIGURATION, AND NEED TO BE
INDICATED TO SELECT ONE OF THEM

610

- gNB CONFIGURES OR TRANSMITS A DL RS, RSRP MEASUREMENT, AND RS TRANSMIT POWER FOR A CC OR BEAM
  - UE OBTAINS PATHLOSS (SEPARATELY FOR BEAM 1, 2, ...)
- gNB CONFIGURES OR TRANSMITS A DL RS, RSRP MEASUREMENT, AND RS TRANSMIT POWER FOR A CC OR BEAM
  - UE OBTAINS PATHLOSS (SEPARATELY FOR BEAM 1, 2, ...)

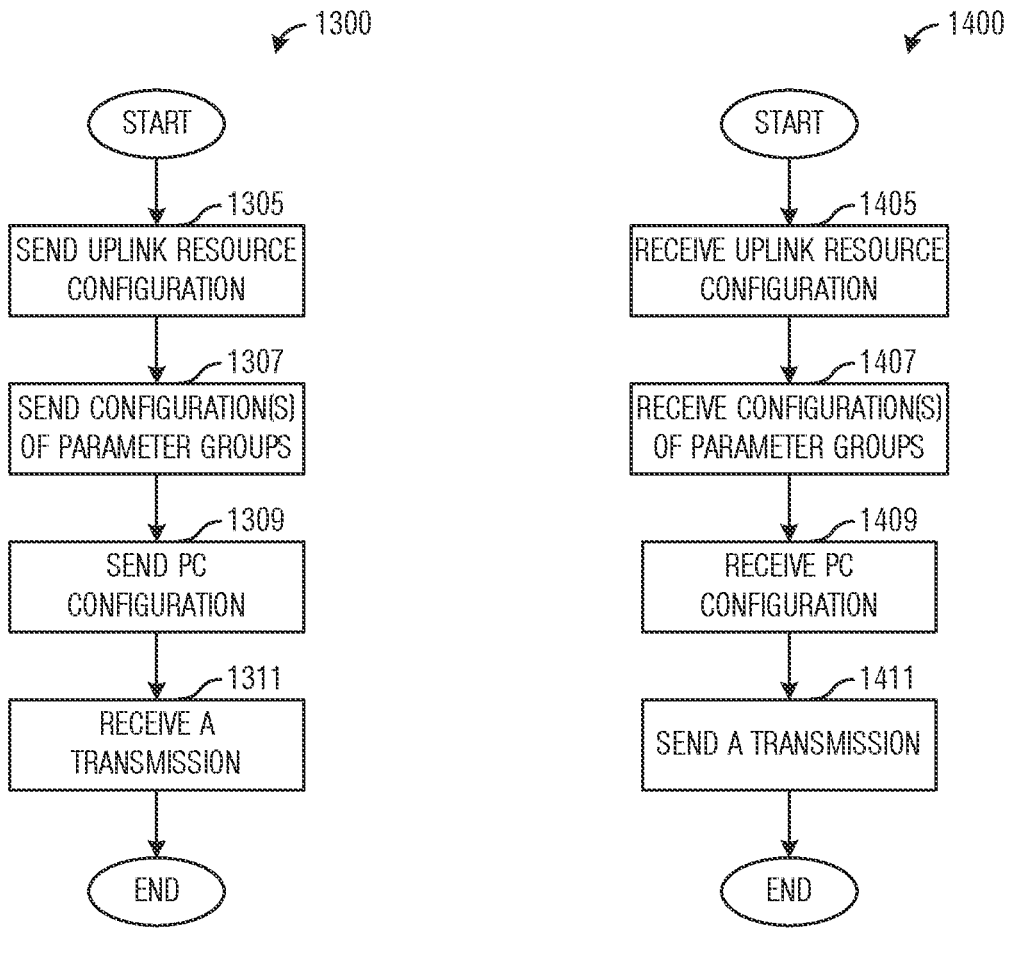
*Fig. 13*                    *Fig. 14*

SYSTEM AND METHOD FOR WIRELESS POWER CONTROL

CROSS-REFERENCE TO RELATED APPLICATIONS

This application is a continuation of U.S. patent application Ser. No. 17/724,292, filed on Apr. 19, 2022, now U.S. Pat. No. 11,924,772, issued on Mar. 5, 2024, entitled "System and Method for Wireless Power Control," which is a continuation of U.S. patent application Ser. No. 16/872,975, filed on May 12, 2020, now U.S. Pat. No. 11,317,355, issued on Apr. 26, 2022, entitled "System and Method for Wireless Power Control," which is a continuation of U.S. patent application Ser. No. 16/538,331, filed on Aug. 12, 2019, now U.S. Pat. No. 10,694,472, issued on Jun. 23, 2020, entitled "System and Method for Wireless Power Control," which is a continuation of U.S. patent application Ser. No. 15/977,872, filed on May 11, 2018, now U.S. Patent No. 10,425,900, issued on Sep. 24, 2019, entitled "System and Method for Wireless Power Control," which claims the benefit of U.S. Provisional Application No. 62/558,190, filed on Sep. 13, 2017, entitled "System and Method for Wireless Power Control," and U.S. Provisional Application No. 62/506,435, filed on May 15, 2017, entitled "System and Method for Wireless Power Control," all of which applications are hereby incorporated herein by reference in their entireties.

TECHNICAL FIELD

The present disclosure relates generally to a system and method for digital communications, and, in particular embodiments, to a system and method for wireless power control.

BACKGROUND

The transmit power level of a communications device can have an impact on the data rate of the communications. If the transmit power level of transmissions from the communications device is too low, the data rate for the communications device may be reduced due to insufficient signal strength, as well as increased susceptibility to interference from other communications devices. If the transmit power level of transmissions from the communications device is too high, the data rate of other communications devices may be negatively impacted due to increased interference arising from transmissions from the communications device.

Next-generation wireless communications systems will have increased flexibility in terms of power control parameters and settings. Hence, the signaling of the power control parameters and settings may be more complex and increase communications overhead, which will negatively impact overall communications system performance.

Therefore, there is a need for systems and methods for wireless power control that scales efficiently with increased number of power control parameters and settings.

SUMMARY

Example embodiments provide a system and method for wireless power control.

In accordance with an example embodiment, a computer implemented method for operating a user equipment (UE) is provided. The method includes receiving, by the UE, at least one of a configuration of a first group of one or more downlink (DL) signals, a configuration of a second group of one or more open-loop power control (PC) parameters, or a configuration of a third group of one or more closed-loop PC parameters, receiving, by the UE, a PC configuration, wherein the PC configuration is associated with at least one of a subset of the first group, a subset of the second group, or a subset of the third group, determining, by the UE, a transmit power level in accordance with the PC configuration and a pathloss, wherein the pathloss is calculated in accordance with the DL signals in the subset of the first group, and transmitting, by the UE, a signal on a set of uplink (UL) resources at the transmit power level.

Optionally, in any of the preceding embodiments, an embodiment wherein each DL signal in the first group of one or more DL signals is associated with a first index.

Optionally, in any of the preceding embodiments, an embodiment wherein the DL signals are DL reference signals (RSs), or synchronization signals (SS) and a physical broadcast channel (PBCH) demodulation reference signal (DMRS) associated with the SS.

Optionally, in any of the preceding embodiments, an embodiment wherein the DL RSs are channel state information RSs (CSI-RSs).

Optionally, in any of the preceding embodiments, an embodiment wherein the third group of one or more closed-loop PC parameters comprises a group of one or more transmit PC (TPC) command configurations.

Optionally, in any of the preceding embodiments, an embodiment wherein the third group of one or more closed-loop PC parameters comprises a group of one or more PC adjustment state configurations.

Optionally, in any of the preceding embodiments, an embodiment wherein each PC adjustment state configuration of the group of one or more PC adjustment state configurations is associated with a third index.

Optionally, in any of the preceding embodiments, an embodiment wherein each open-loop PC parameter of the second group of one or more open-loop PC parameters comprises a PO and alpha (a) parameter pair, with each PO and alpha (a) parameter pair being associated with a second index.

Optionally, in any of the preceding embodiments, an embodiment further comprising receiving, by the UE, a configuration of one or more sets of UL resources, and wherein the one or more sets of UL resources comprises at least one of sounding reference signal (SRS) resources, physical uplink control channel (PUCCH) resources, or resources used for a physical uplink shared channel (PUSCH).

Optionally, in any of the preceding embodiments, an embodiment wherein the PC configuration is associated with the signal transmitted on the set of UL resources.

Optionally, in any of the preceding embodiments, an embodiment wherein the transmit power level is further selected in accordance with a power limit value associated with the UE.

Optionally, in any of the preceding embodiments, an embodiment further comprising receiving, by the UE, a DL transmit power level for a port of the DL signals in the subset of the first group.

Optionally, in any of the preceding embodiments, an embodiment wherein the DL transmit power level is received in a system information block (SIB).

Optionally, in any of the preceding embodiments, an embodiment wherein the transmit power level is further selected in accordance with a reference signal received power (RSRP) associated with the port and the DL transmit power level for the port.

Optionally, in any of the preceding embodiments, an embodiment wherein the PC configuration is associated with a unique identifier.

Optionally, in any of the preceding embodiments, an embodiment wherein the PC configuration is associated with a first index, a second index, and a third index.

In accordance with an example embodiment, a computer implemented method for operating an access node is provided. The method includes sending, by the access node, at least one of a configuration of a first group of one or more DL signals, a configuration of a second group of one or more open-loop PC parameters, or a configuration of a third group of one or more closed-loop PC parameters, sending, by the access node, a PC configuration, wherein the PC configuration is associated with at least one of a subset of the first group, a subset of the second group, or a subset of the third group, and receiving, by the access node from a UE, a signal on a set of UL resources at a transmit power level selected in accordance with the PC configuration and a pathloss, wherein the pathloss is calculated in accordance with the DL signals in the subset of the first group.

Optionally, in any of the preceding embodiments, an embodiment further comprising sending, by the access node, a configuration of one or more sets of UL resources, and wherein the one or more sets of UL resources comprises at least one of SRS resources, PUCCH resources, or resources used for a PUSCH.

Optionally, in any of the preceding embodiments, an embodiment wherein the transmit power level is further selected in accordance with a power limit value associated with the UE.

Optionally, in any of the preceding embodiments, an embodiment further comprising sending, by the access node, a DL transmit power level for a port of the DL signals in the subset of the first group.

In accordance with an example embodiment, a UE is provided. The UE includes a memory storage comprising instructions, and one or more processors in communication with the memory storage. Where the one or more processors execute the instructions to receive at least one of a configuration of a first group of one or more DL signals, a configuration of a second group of one or more open-loop PC parameters, or a configuration of a third group of one or more closed-loop PC parameters, receive a PC configuration, wherein the PC configuration is associated with at least one of a subset of the first group, a subset of the second group, or a subset of the third group, determine a transmit power level in accordance with the PC configuration and a pathloss, wherein the pathloss is calculated in accordance with the DL signals in the subset of the first group, and transmit a signal on a set of UL resources at the transmit power level.

Optionally, in any of the preceding embodiments, an embodiment wherein the one or more processors further execute the instructions to receive a configuration of one or more sets of UL resources, and wherein the one or more sets of UL resources comprises at least one of SRS resources, PUCCH resources, or resources used for a PUSCH.

Optionally, in any of the preceding embodiments, an embodiment wherein the one or more processors further execute the instructions to also select the transmit power level in accordance with a power limit value associated with the UE.

Optionally, in any of the preceding embodiments, an embodiment wherein the one or more processors further execute the instructions to receive a DL transmit power level for a port of the DL signals in the subset of the first group.

In accordance with an example embodiment, an access node is provided. The access node includes a memory storage comprising instructions, and one or more processors in communication with the memory storage. Where the one or more processors execute the instructions to send at least one of a configuration of a first group of one or more DL signals, a configuration of a second group of one or more open-loop PC parameters, or a configuration of a third group of one or more closed-loop PC parameters, send a PC configuration, wherein the PC configuration is associated with at least one of a subset of the first group, a subset of the second group, or a subset of the third group, and receive, from a UE, a signal on a set of UL resources at a transmit power level selected in accordance with the PC configuration and a pathloss, wherein the pathloss is calculated in accordance with the DL signals in the subset of the first group.

Optionally, in any of the preceding embodiments, an embodiment wherein the one or more processors further execute the instructions to send a configuration of one or more sets of UL resources, and wherein the one or more sets of UL resources comprises at least one of SRS resources, PUCCH resources, or resources used for a PUSCH.

Optionally, in any of the preceding embodiments, an embodiment wherein the one or more processors further execute the instructions to send a DL transmit power level for a port of the DL signals in the subset of the first group.

Optionally, in any of the preceding embodiments, an embodiment wherein the transmit power level is further selected in accordance with a power limit value associated with the UE.

Practice of the foregoing embodiments enables the efficient signaling of power control parameters and settings as the number of power control parameters and settings of a communications system increase. Hence, the signaling of the power control parameters and settings do not negatively impact the overall communications performance of the communications system by significantly increasing the communications overhead.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 illustrates first example power control parameters for a NR communications system according to example embodiments described herein;

FIG. 6 illustrates second example power control parameters for a NR communications system according to example embodiments described herein;

FIG. 13 illustrates a flow diagram of example operations occurring in an access node communicating with a UE using power control specified by groups of power control parameters according to example embodiments described herein;

FIG. 14 illustrates a flow diagram of example operations occurring in a UE communicating with an access node using power control specified by groups of power control parameters according to example embodiments described herein;

DETAILED DESCRIPTION OF ILLUSTRATIVE
EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
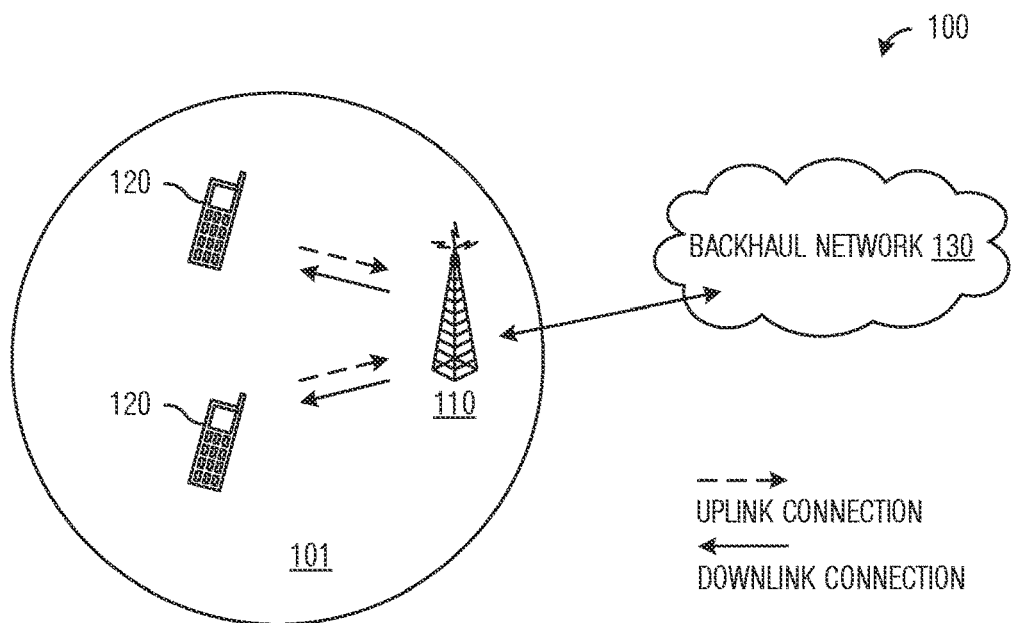
FIG. 1 illustrates an example wireless communications system according to example embodiments described herein.

FIG. 1 illustrates an example wireless communications system 100. Communications system 100 includes an access node 110 with a coverage area 101. Access node 110 serves a plurality of user equipments (UEs) 120. Communications system 100 also includes a backhaul network 130. As shown, access node 110 establishes uplink channels (shown as dashed lines) or downlink channels (shown as solid lines) with UEs 120, which serve to carry data from UEs 120 to access node 110 and vice-versa. Data carried over the uplink or downlink channels may include data communicated between UEs 120, as well as data communicated to or from a remote-end (not shown) by way of backhaul network 130.

In a cellular operating mode, communications to and from the plurality of UEs go through access node 105, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., Third Generation Partnership Project (3GPP) long term evolution (LTE), 3GPP LTE advanced (LTE-A), Fifth Generation (5G), 5G LTE, 5G New Radio (NR), High Speed Packet Access (HSPA), Wi-Fi 802.11a, b, g, n, or ac, etc. While it is understood that communications systems may employ multiple access nodes capable of communicating with a number of UEs, only one access node, and two UEs are illustrated for simplicity.

Figure 2A:
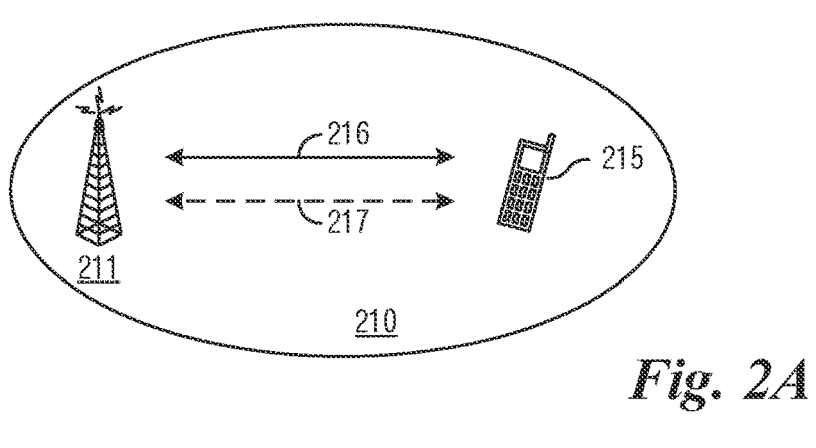
FIG. 2A illustrates a wireless network for supporting carrier aggregation (CA) or carrier switching (CS)

FIG. 2A illustrates a wireless network 210 for supporting carrier aggregation (CA) or carrier switching (CS). As shown, an access node 211 communicates with a UE 215 over different component carriers 216, 217. In some embodiments, component carrier 216 is a primary component carrier (PCC), and component carrier 217 is a secondary component carrier (SCC). In an embodiment, the PCC carries control information (e.g., feedback from UE 215 to access node 211), and the SCC carries data traffic. In the 3GPP Rel-10 specification, a component carrier is called a cell. When multiple cells are controlled by the same eNB, a single scheduler may perform cross scheduling of multiple cells. In the context of carrier aggregation, one high-power node may operate and control several component carriers, thereby forming a primary cell (Pcell) and secondary cell (Scell). A primary carrier that is communicated from an access node to a UE may be referred to as a Downlink Primary Component Carrier (DL PCC), while a primary carrier communicated from a UE to an access node may be referred to as an Uplink Primary Component Carrier (UL PCC). A secondary carrier that is communicated from an access node to a UE may be referred to as a Downlink Secondary Component Carrier (DL SCC), while a secondary carrier communicated from a UE to an access node may be referred to as an Uplink Secondary Component Carrier (UL SCC). In 3GPP Rel-11 design, an eNB may control both a Macro cell and a Pico cell. In this case, the backhaul between the Macro cell and the Pico cell is a fast backhaul. The eNB can control the transmission or reception of both macro cell and Pico cell dynamically. It is noted that the terms carriers, channels, bands, subbands, bandwidth parts, frequency units, virtual carriers, cells, virtual cells, etc., when referring to a set of generally contiguous frequency resources configured or used for a UE refers to one unit for the scheduler to operate on.

Figure 2B:
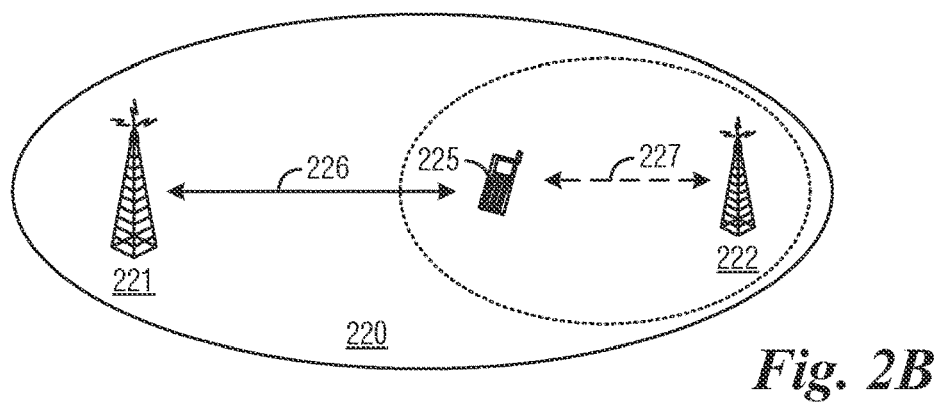
FIG. 2B illustrates a wireless heterogeneous network (HetNet) configured to support carrier aggregation or carrier selection.

In a modern wireless networks, access nodes may be grouped together to form a cluster of access nodes. Each access node in the cluster may have multiple antennas, and may be providing wireless access to multiple UEs in a wireless coverage area of the corresponding access node. Resources may be assigned to the UEs based on a scheduling algorithm, e.g., proportional fairness, round robin, etc. FIG. 2B illustrates a wireless heterogeneous network (HetNet) 220 configured to support carrier aggregation or carrier selection. As shown, access nodes 221, 222 communicate with a UE 225 over different component carriers 226, 227. Access node 221 may be a high-power node (e.g., a macro-cell), and access node 222 may be a low power node, e.g., a pico-cell, femto-cell, micro-cell, relay, remote radio head (RRHs), remote radio unit, a distributed antennas, etc. Accordingly, access node 222 may have a smaller coverage area than access node 221. Low-power nodes may provide improved cellular coverage, capacity and applications for homes and businesses, as well as metropolitan and rural public spaces.

Figure 2C:
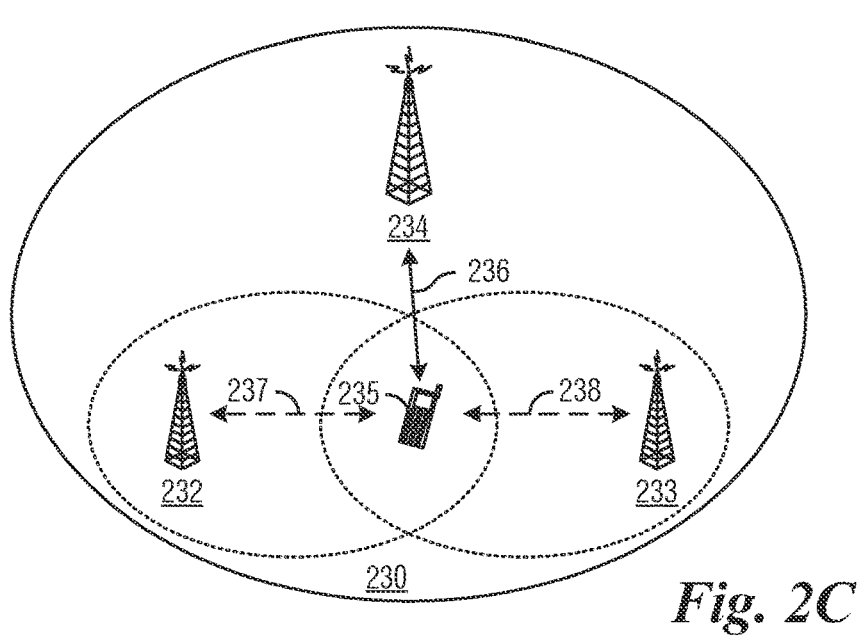
FIG. 2C illustrates another wireless heterogeneous network (HetNet) configured to support carrier aggregation, carrier selection, or dual connectivity.

FIG. 2C illustrates another wireless heterogeneous network (HetNet) 230 configured to support carrier aggregation, carrier selection, or dual connectivity. As shown, access nodes (or transmission or reception points, TRPs) 232, 233, 234 communicate with a UE 235 over different component carriers 236, 237, 238. The access node 234 may be a high-power node (e.g., a macro-cell), and the access nodes 232, 233 may be a low power node, e.g., a pico-cell, femto-cell, micro-cell, relay, remote radio head (RRHs), remote radio unit, a distributed antennas, etc. The access nodes or TRPs at different locations may be connected via fast backhaul (sometimes referred to as an ideal backhaul) which makes the access nodes or TRPs act as one access node or controlled as one access node. The access nodes or TRPs at different locations may be connected via a non-ideal backhaul which requires the radio resources at each location to be managed with certain autonomy, especially for fast time-scale resources at physical (PHY) or media access control (MAC) layers, but coordinated across the locations via the non-ideal backhaul in slow time-scale for some radio resource control (RRC) and higher (or upper) layers. This is referred to as dual connectivity. As related to antenna ports from the same TRP location, they may share certain commonalities, such as the same doppler spread, delay spread, etc. In general, the network generally does not reveal the antenna port location information to the UE, but in some cases, it may help to signal the UE about the commonalities of the antenna ports. The signalled properties are referred quasi-collocation (QCL) relations. The QCL relations may defines a relationship between two reference signals or data signals such that the two signals may be viewed as possessing similar characteristics. Example characteristics include carrier frequency, time offset, frequency offset, spatial pre-coding vectors, and so on.

Although FIGS. 2B-2C depict access nodes communicating with a UE over different component carriers, it should be appreciated that, in some implementations, access nodes in a Het-Net may communicate with a UE over the same component carriers.

Some Het-Nets may have multiple high-power access nodes or multiple low-power access nodes operating over multiple component carriers. Access nodes in the same Het-Net may be interconnected by fast or slow backhaul connections depending on the deployment. Fast backhaul connections may be utilized to improve coordination between the access nodes, such as to effectuate joint-transmission or reception. Multiple remote radio units may be connected to the same base band unit of the eNB by fiber cable to support relatively low latency communications between base band unit and remote radio unit. In some embodiments, the same base band unit processes coordinated transmission or reception of multiple cells. For example, a base band unit may coordinate a joint transmission (e.g., a coordinated multiple point (CoMP) transmission) from multiple access nodes to a UE or transmissions of multiple cells to a terminal to effectuate a COMP transmission. As another example, a base band unit may coordinate a joint reception of a signal communicated from a UE to multiple access nodes to effectuate a COMP reception. Fast backhaul connections may also be used to coordinate joint scheduling between different access nodes. Densely deployed networks are an extension of HetNets, and include relatively large numbers of densely deployed low power access nodes to provide improved coverage and throughput. Densely deployed networks may be especially well-suited for indoor or outdoor hotspot deployments.

In a wireless network, reference signals, data signals, and control signals may be communicated over orthogonal time-frequency resources. Orthogonal frequency-division multiplexing (OFDM) is generally used, with cyclic-shift (CP-) OFDM being a commonly used variant. For example, the respective signals may be mapped to different resource elements (REs) in a resource block (RB) of a radio frame. In some cases, variants or related, such as Discrete Fourier Transform-spread OFDM (DFT-S-OFDM), Interleaved frequency division multiple access, OFDMA, SC-FDMA, and so on, can be used.

Figure 3:
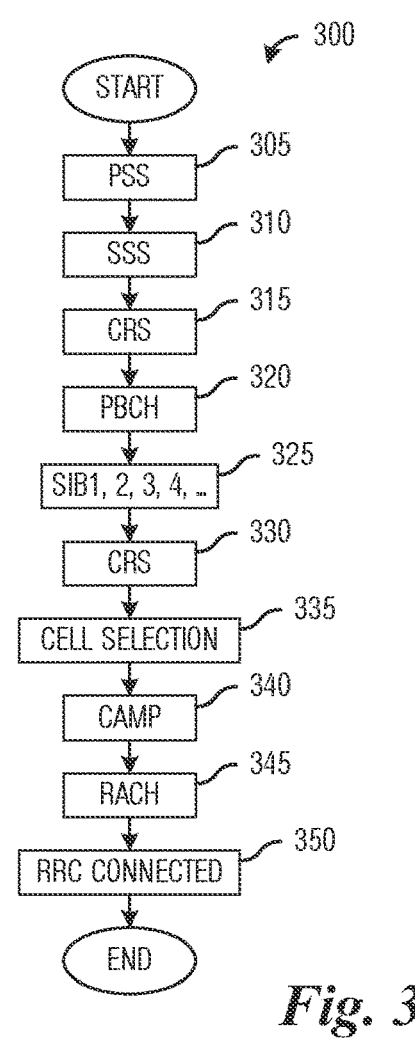
FIG. 3 illustrates an embodiment method for processing signals for 3GPP LTE, as may be performed by a UE.

FIG. 3 illustrates an embodiment method 300 for processing signals for 3GPP LTE, as may be performed by a UE. At steps 305 and 310, the UE processes a primary synchronization signal (PSS) and a secondary synchronization signal (SSS), respectively, to determine a cell identity and a frame timing of a physical broadcast channel. At step 315, the UE processes a cell-specific reference signal (CRS) of the physical broadcast channel to obtain channel information, as in 3GPP LTE; in 3GPP NR or other systems, the CRS may not present, and channel information may be obtained from the SSS, a demodulation reference signal (DMRS), a discovery reference signal (DRS), a channel state information reference signal (CSI-RS), and so on. At step 320, the UE processes a physical broadcast channel (PBCH) to obtain system information block (SIB) messages for one or more carriers, e.g., SIB1, SIB2, etc. At step 325, the UE processes SIB messages to obtain system information, e.g., downlink control information (DCI), associated with the corresponding component carriers. The DCI may provide information about transmission parameters (e.g., modulation and coding scheme (MCS) parameters, etc.) used to transmit the respective candidate carriers. At step 330, the UE processes CRSs in the candidate carriers to estimate a channel quality associated with each of the respective candidate carriers.

At steps 335, the UE performs cell selection based on the channel quality (e.g., channel quality information) estimated in step 330. At step 340 and 345, the UE begins to monitor the selected carrier and performs a random access transmission (RACH) uplink transmission to request resources of the selected carrier be scheduled to the UE. At step 350, the UE transitions from an RRC_IDLE mode into an RRC_CONNECTED mode. This may be achieved by exchanging messages with an access node associated with the respective carrier, for example. Similar procedures may be considered for 3GPP NR, with potentially different terminology or notation.

At the 3GPP radio access network (RAN) meeting number 71 (RAN #71 meeting), the new 5G Study Item on New Radio Access Technology (RAT) was approved, aiming to identify and develop the technology components needed for successfully standardizing the NR system for 5G. In what follows, considerations of physical layer procedures and RS design and configuration for UE-oriented access were discussed.

The following deployment scenarios are important to cellular systems and have been supported for 3GPP LTE. They should be supported for NR and possible enhancements and optimization may be considered for these deployment scenarios.

1) UE density is higher (or much higher) than TRP or carrier density—This is a typical scenario in 3GPP LTE. In NR, UE density may be even greater than in 3GPP LTE. NR design should provide efficient support for this scenario (e.g., this scenario is more suitable for DL-based measurement).

2) TRP or carrier density is higher (or much higher) than UE density—This may be an outcome of network densification, and is a key scenario to be considered and efficiently supported in NR. The design principles could be rather different from the above scenario; for example, UL-based measurement, UE-oriented access, etc., may be more suitable for this scenario.

3) A network generally includes both TRPs or carriers supporting initial access procedure and TRPs or carriers not supporting initial access procedures. Some TRPs or carriers have to support initial access procedures (such as transmitting SS directly discoverable by UE) and related functionalities, referred to as standalone (SA) TRPs (simply SA for short), whereas some other do not have to support initial access procedures, referred to as non-standalone (NSA) TRPs (simply NSA for short). Not all TRPs or carriers need to support initial access procedures. To help reduce network costs and complexities, a network, especially a dense network, generally includes fewer TRPs or carriers supporting initial access procedure than those that do not. NSA TRPs or carriers can be accessed via some assistance from SA TRPs or carriers.

Therefore, NR should support all deployment scenarios in 3GPP LTE, including those with high UE density or high TRP or carrier density, and with a subset of the TRPs or carriers supporting initial access procedure.

The above scenarios are generally common to both NR and 3GPP LTE. However, NR possesses some new characteristics that are different from 3GPP LTE. As an example, NR will support high-frequency carriers with narrow-beam transmissions, possibly via analog beamforming. As another example, NR operates with "lightweight carriers". More specifically, with network densification and requirements for increased flexibility in operation, lightweight carriers with reduced common overhead especially CRS are considered for NR.

As discussed previously, transmit power control (such as uplink transmit power control) is an important element of 3GPP LTE, striking a desirable balance between interference management and throughput performance for various scenarios. As an example, uplink transmit power control balances uplink interference management and uplink throughput performance. Transmit power control is to be supported in NR, with enhancements according to new scenarios and requirements of NR. It is noted that although the discussion presented herein focusses on uplink transmit power control, the example embodiments presented are operable for downlink transmit power control. Therefore, the focus on uplink transmit power control should not be construed as being limiting to either the scope or spirit of the example embodiments.

The following scenarios may be considered for uplink transmit power control in NR. It is noted that some scenarios presented herein are new and not present in 3GPP LTE.

No CRS: Uplink transmit power control in 3GPP LTE is based on pathloss (PL) that is estimated in the downlink. The estimation of the PL is obtained based on CRS. However, CRS is not likely to be present in NR. Hence, the PL estimate has to rely on another RS or a new mechanism.

Beam-based transmissions or receptions: In NR, transmissions and receptions may be based on beams, potentially very narrow beams, especially in high-frequency (HF) or massively multiple input multiple output (MIMO) deployments. In addition, beam widths, and therefore, beamforming gains, between the same access node and UE can vary significantly, for different times and channels. There are two main implications for beam-based transmissions or receptions:

UE transmission becomes narrow-beam and access node reception becomes narrow-beam as well. The probability of a narrow-beam uplink transmission interfering with another access node's narrow-beam reception is generally low. Consequently, the need for very accurate uplink transmit power control to reduce interference becomes less critical in NR than in 3GPP LTE.

Narrow-beam transmissions and receptions cause receive power variations due to differences in beamforming. As an example, a UE sees higher receive power in the downlink as the downlink beam is refined and becomes narrower, and the access node sees higher receive power in the uplink as the uplink beam is refined and becomes narrower. Which downlink receive power should be used for the PL estimate and which uplink receiver power should be used as the transmit power control operating point need to be determined.

Analog beamforming at access nodes or UEs: NR HF may adopt analog beamforming at access nodes and UEs. In order to transmit and receive with analog beamforming, the analog direction needs to be known before the transmission and reception (e.g., a transmission in a physical uplink shared channel (PUSCH)) can occur. In scheduled transmissions, knowledge of the analog direction is not an issue. However, in non-scheduled uplink transmissions (e.g., a transmission of a contention-based RACH, or a grant-free uplink signal) lack of knowledge of the analog direction may require the reception of the transmission with a wider analog beam at the access node with no or low analog beam forming gain. The use of the wide analog beam should be reflected in setting the power level of the uplink transmission.

Uplink COMP: Uplink COMP in NR may similar to 3GPP LTE Rel-11 COMP but may be encountered more frequently in NR. Therefore, uplink COMP should be considered as an important scenario for NR, especially the uplink transmit power control aspect. In 3GPP LTE Rel-11, one uplink transmit power control setting based on a serving cell is used by a UE for all serving access nodes, thus the received signal power levels at some access nodes may be higher or lower than expected. A question to consider is how uplink transmit power control may be enhanced to better support uplink COMP.

Multiple numerologies: A UE may support multiple numerologies, and how uplink transmit power control should be set for different numerologies should be discussed. A numerology may specify the subcarrier spacing, subframe or slot or symbol durations, bandwidths of carriers or bandwidth parts or subbands, CP lengths, carrier frequency, possible time or frequency configurations of SS blocks or bursts, and so on.

Uplink beacon transmissions without previous reception of downlink transmission from a potential target access node: In NR, it may be useful to introduce a new uplink signal referred to as an uplink beacon. The uplink beacon is transmitted by a UE to allow neighboring access nodes to discover the UE without relying on the downlink transmissions of the access nodes. In this scenario, the UE does not know the target(s) of the uplink beacons, nor does the PL estimates of channels to the target(s). How the UE sets its uplink transmit power level is a topic for discussion.

Dynamic TDD (D-TDD) may require further enhanced uplink transmit power level control to reduce UE-to-UE interference: D-TDD is a flexible and dynamic evolution of enhanced interference mitigation and traffic adaptation (eMITA). The dual-loop uplink transmit power control enhancement introduced in eMITA that is subframe set dependent may become insufficient, and uplink transmit power control should be further enhanced when considering D-TDD.

Designs or enhancements for uplink transmit power control may include:

First of all, the uplink transmit power control in 3GPP LTE, referred to as fractional power control (FPC), provides a general framework and is expected to work well for any OFDM or single carrier OFDM (SC-OFDM) based communications system. The general form for UE transmission power is expressible as $$P(i) = \min \left\{ \begin{array}{l} P_{CMAX}(i), \\ 10 \log_{10}(M(i)) + P_O(j) + \alpha(j) \cdot PL + \Delta_{TF}(i) + f(i) \end{array} \right\},$$

where P(i) is the transmission power on a carrier (or cell, bandwidth part (BWP), and so on) for subframe i, $P_{CMAX}(i)$ is the configured UE transmit power in subframe i for the carrier, M(i) is the bandwidth factor, Po is an open-loop power control offset parameter, $\alpha$ (or equivalently, alpha) is the open-loop power control scaling parameter, PL is the pathloss estimate, $\Delta_{TF}(i)$ is the MCS factor, and f(i) is the closed-loop power control adjustment state (or simply loop state, loop status, loop status value, and so on). The UE transmission power captures the UE maximum power, bandwidth allocation factor, open-loop power control, MCS factor, and closed-loop offset. Clearly, the transmission power for the UE is comprehensive and flexible, and may be used as the baseline for the framework for uplink transmit power control in NR.

If accumulation is configured, i.e., f(i)=f(i−1)+δ(i−K), then δ is the closed-loop correction value (also referred to as a TPC command) and f(i) is the closed-loop power control adjustment state or the loop state. If accumulation is not configured, i.e., absolute closed-loop power control, f(i)=δ(i−K), then the closed-loop power control adjustment state or the loop state is the δ or the TPC command and the loop is actually memoryless. Multiple subframe sets may be configured, and each subframe set can use one set of the open-loop power control parameters (i.e., $\alpha$ and $P_o$) and its own loop state. But the subframe sets may share the same PL and δ (the TPC command).

Figures 4, 9:
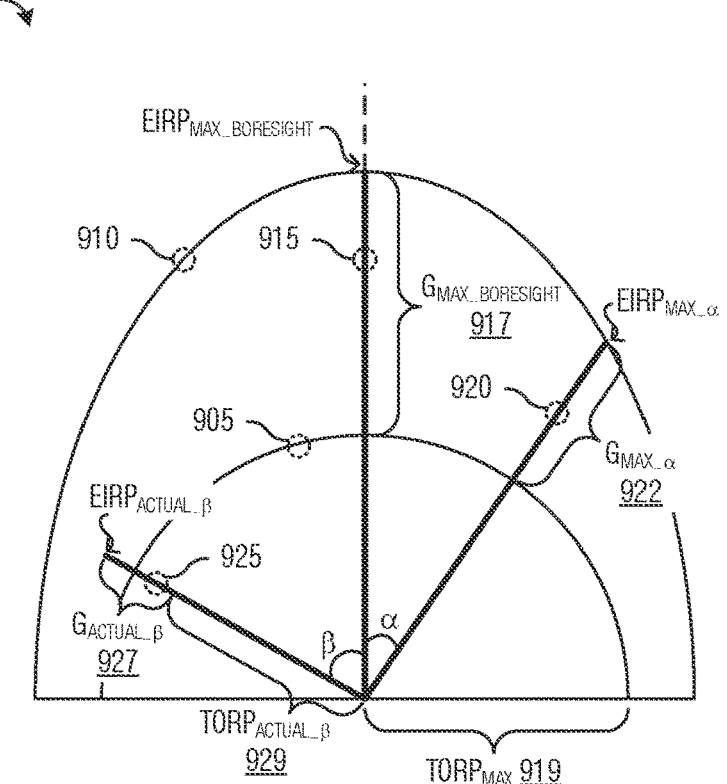
FIG. 4 illustrates power control parameters in 3GPP LTE.
FIG. 9 illustrates a diagram of radiated power for an example directional antenna according to example embodiments described herein.

FIG. 4 illustrates power control parameters 400 in 3GPP LTE. Power control parameters 400 in 3GPP LTE may include PUSCHs configured for CCs 405 with parameters $\alpha$ (or equivalently, alpha), $P_o$, optional TPC resources and RNTI for each PUSCH, PUCCHs configured for CC 410 with parameters $P_o$ and optional TPC resources and RNTI for each PUCCH, as well as TPC resources and RNTI that are implicit in DCI 415. It is noted that PL may not require configuration 420. It is noted that there is a rigid association between a power control setting and an associated signal in 3GPP LTE.

Nevertheless, some variations or enhancements may be introduced in NR to address the new scenarios described previously. Some options are listed for further consideration:

No CRS for PL estimate: One option is that PL estimates may be based on DRS, SS, non-UE specific downlink RS, or other long-term downlink RS.

Beam-based transmissions or receptions: PL estimates may be based on beams, i.e., beam-specific PL estimates may be used. Moreover, narrow-beam downlink RSs may not provide a robust estimate of the PL, and the associated high beamforming gain may cause the UE to underestimate the PL. Therefore, wide-beam downlink RSs may be used for PL estimates, which may lead to higher than necessary uplink transmission power levels if the transmission is narrow-beamed. However, as described previously, the use of narrow-beamed transmissions may not interfere with other access nodes due to the narrow-beamed nature of the transmissions.

Analog beamforming at access node or UE: In order to support grant-free uplink transmissions, the access node may need to use a wide analog beam, and hence the uplink transmit power control for any grant-free transmission should not be based on a narrow-beam downlink RS. An option may be to use wide-beam, long-term downlink RSs in PL estimation and uplink transmit power control for all grant-free uplink transmissions.

Uplink CoMP: A potential enhancement may be to specify access node-specific uplink transmit power control settings for uplink COMP. That is, the UE applies different uplink transmit power control settings for different access nodes. This may also be generalized to cover multi-beam uplink transmissions.

Multiple numerologies: For multiple numerologies, multiple uplink transmit power control settings may be provided. In other words, a UE with multiple uplink numerologies may need to support multiple numerology-specific uplink transmit power control settings.

Uplink transmission without previous reception of downlink transmission: The UE may not be able to obtain a PL estimate. The serving access node may signal a PL estimate (or uplink transmission power) to the UE and the signalled value may be estimated by the access node based on, e.g., access node density near the UE, any other side information, and so on. The any other side information may be implementation dependent.

D-TDD: More advanced techniques for determining the UE-to-UE interference level and setting the uplink transmission power level may be considered. Due to the dramatic fluctuation of interference levels in the time domain, instant and accurate measurement or sensing may be needed to enable the further enhancement of uplink transmit power control for D-TDD.

It is noted that transmit power control in NR may be quite diverse and complicated. Therefore, a unified power control framework in NR is needed. In addition to directly providing power control values, a power control setting may necessarily include essential elements and optional elements. According to an example embodiment, power control settings may be specified with the essential elements, along with one or more optional elements. Corresponding UE behavior is well defined. Multiple power control settings may share some common elements.

In an embodiment, a first essential element is a time, frequency, antenna, antenna port, beam, or panel resource for uplink transmission. The resources may be defined in accordance with channel and signals, such as PUSCH, physical uplink control channel (PUCCH), sounding reference signals (SRS), RACH, and so on. One type of channel or signal may correspond to one or more types of resources, depending on the properties of the channel or signal and resources. Different types of uplink resources may use different power control settings. As an example, PUSCH and PUCCH use different resources and have different properties, so different power control settings are used. As another example, PUSCH with persistent scheduling and PUSCH scheduled by DCI may have different $P_o$ values and hence, different power control settings (although the same $\alpha$ values may be shared). As yet another example, PUSCH with one beam may use a different power control setting for PUSCH with another beam, but if the corresponding receive beams at the receive side (i.e., the network side) have certain QCL relationships, the power control settings may share some common elements. Similar distinctions hold true for other channels and signals, such as PUCCH, SRS, RACH, as well as newly introduced signals or channels.

In an embodiment, a second essential element is parameters used to determine the power level. The parameters mainly include two types: semi-static power control parameters and dynamic power control parameters. The semi-static power control parameters are typically essential to determine the power level and include $\alpha$ and $P_o$ (which may be the target received power level) or the equivalent, which are often referred to as open-loop power control parameters. Power ramping values may also be included as semi-static power control parameters. In some cases, the transmission power level or a reference factor may be specified so that a UE can determine the transmit power based on it. The semi-static power control parameters may be configured (or specified) to a UE through RRC signalling.

The dynamic power control parameters include the loop states, closed-loop TPC commands, and bandwidth or MCS adjustment factors. The TPC commands may be absolute or accumulative in nature. In existing systems, TPC commands may be 1 bit or 2 bits for PUSCH, PUCCH, or SRS, and 3 bits for message 3 PUSCH in RACH procedures. The TPC commands are typically carried in DCI, but for the RACH case, the TPC commands are carried in a random access response (RAR). The TPC commands may be used for closed-loop adjustment and may be helpful in setting accurate transmit power levels. However, the TPC commands may not be present in all power control settings. The loop states may determine how many power control loops (i.e., closed-loop) are configured for the UE and needs to maintain. For absolute TPC commands, the loop state is equal to the TPC command and is memoryless. Otherwise, the loop state is a cumulative sum (an integral) of the TPC commands associated with the loop. In 3GPP LTE, the loop state does not require any configuration signaling, but is specified in the 3GPP LTE technical standards in simple form and its association with other elements are also specified in the 3GPP LTE technical standards. However, in NR, the loop state may need to be associated with other elements in more complex ways. As an example, to allow for flexibility, configuration signaling for loop states may need to be designed. Some of the associations may still be defined in associated technical standards, but some may be configured in RRC signalling, and in the most flexible cases, when and which loop state to be used for an uplink transmission may be specified in MAC or PHY signalling. An embodiment is to provide information about which loop state (by specifying a loop state index, for example) to use in DCI with the TPC command.

Another element is the PL estimate used in the power control. The PL estimate may be generated in accordance with downlink RS or uplink RS or even no RS. Based on the RS, the receiver may obtain reference signal received power (RSRP) values. Then, by removing the transmission power (TxP) associated with the RS, the PL estimate may be obtained. As an example, PL=per-port TxP–RSRP, where per-port TxP is generally the reference signal power signalled to the UE for an associated RS or SS. When multiple antenna ports, panels, etc., are used for the RS, the per-port RSRP should be used and the per-port TxP should be signalled from the transmitter side to the receiver side (otherwise, if the total TxP is signaled, the number of ports should also be signaled). This should be applied to all RS or signals in the PL estimate, e.g., SS (SSS in particular), physical broadcast channel (PBCH) DMRS, CSI-RS, PDSCH DMRS if used for RSRP calculation, uplink signals for PL estimation by the network, etc. In general, the number of ports for the RS may be signalled to the receiver. So, if the receiver receives RS from multiple ports of a RS, the receiver may correctly use the corresponding per-port TxP to determine the PL estimate. It is noted that a port in a first RS may actually be a layer or stream formed by multiple ports of a second RS, and the transmitter has to either adjust the power so that the per-port TxP of the first RS equals the per-port TxP of the second RS, or signal the per-port TxPs of the first and second RSs to the receiver. In an embodiment, when no PL estimate is available, power ramping from an initially small power value may be used.

An example PUSCH PC setting may be configured as follows. The network configures PUSCH on a component carrier (CC) or BWP associated an access node and uses DCI or RRC to specify the time or frequency resource allocation for the PUSCH. The network configures semi-static power control parameters $\alpha$ and $P_o$ for DCI triggered PUSCH and another set of semi-static power control parameter $\alpha$ and $P_o$ for semi-persistent PUSCH. The network configures a closed loop TPC command for the PC setting, such as the radio network temporary identifier (RNTI) associated with a group DCI and the TPC command bit allocation information for the power control setting within the group DCI. The TPC command configuration may also be specified in a standard specification if the DCI is dedicated to the UE. The loop state is specified as separate from PUCCH, PUSCH on subframe set 2 in TDD, and so on. That is, there may be 3 loops for the UE to maintain: 1) PUSCH (on subframe set 1 in TDD), 2) PUCCH, and 3) PUSCH on subframe set 2 in TDD. The network configures several sets of the downlink RS, among which one is configured for this power control setting, such as a CSI-RS, and the per-port TxP is signalled to the UE. The UE then uses the CSI-RS for per-port RSRP measurement (if multiple ports are present, the first port can be used, or the RSRP for all ports can be determined and the mean RSRP is used as the per-port RSRP), and subtracts the RSRP from the per-port TxP to obtain the PL estimate associated with the CSI-RS and hence the power control setting. The PL estimate and open-loop PC parameters are used to generate the open loop power control value. This value may be further updated based on TPC value and bandwidth factor associated with a PUSCH transmission, and applied to the PUSCH transmission.

The above power control setting methodology can be easily extended for multiple PUSCH power control settings, one or more PUCCH power control settings, one or more SRS power control settings, and with suitable modifications, one or multiple PRACH power control settings. Multiple power control settings may be needed for one type of channel, e.g., PUSCH, due to multiple carriers, bandwidth parts, cells, cell groups, access nodes, transmit beams at the UE or network, receive beams at the UE or network, transmit panels at the UE or network, receive panels at the UE or network, number of transmit or receive antenna ports at the UE or network, RS, numerologies, interference conditions, duplex, resource allocation in different subframes, subframe or slot types, etc.

When such multiple power control settings are defined, each power control setting is defined individually and associated with the corresponding uplink signal in the corresponding CC and beam, etc. For example, an access node may configure, for a UE, an uplink signal (e.g., PUSCH) for a CC and a beam. Then the access node configures power control parameters and resources for the signal, such as $\alpha$ and $P_o$, for the signal on the CC with the beam. If the PUSCH is semi-persistent signalled (SPS), triggered by DCI, or grant-free, then a first set of $\alpha$ and $P_o$ is configured for SPS, a second set of $\alpha$ and $P_o$ is configured for PUSCH triggered by DCI, and a third set of $\alpha$ and $P_o$ is configured for grant-free PUSCH. Then for PUSCH on another CC or with another beam, the access node also configures power control parameters and resources. Similar processes are repeated for other signals (e.g., PUCCH, SRS, RACH, UL beacon, etc.) and other uplink channels, uplink resources, uplink configurations, uplink settings, etc. Alternatively, the configurations may be, for each CC, one or more signals are configured, and then for each signal, multiple power control parameters and resources are configured for each type (SPS, DCI triggered, or grant-free, with other signals simultaneously or without, etc.) and for each beam, numerology, etc., and further this is repeated for other CCs and so on.

Correspondingly in downlink, the network configures or specifies downlink SS or RS for a CC or a beam, configures or specifies downlink SS or RS based RSRP measurement for a CC or a beam, and signals per-port TxP of the downlink SS RS for a CC or a beam. It is noted that not all downlink SS or RS and the associated RSRP need to be configured for the UE because the UE may be able to discover the SS or RS according to technical standards or predefined protocols, such as PSS, SSS, DRS, Layer 3 CSI-RS, and so on. Then the UE obtains a PL estimate for a CC or a beam. Then the per-CC PL estimate or per-beam PL estimate is used if an uplink signal is to be transmitted. For example, if an uplink signal is to be transmitted on a CC associated with a beam where the beam may be an uplink beam (obtained via beam management process, for example) or a downlink beam for a downlink RS or SS, the per-CC and per-beam PL estimate associated with the uplink beam or downlink beam is used to set the power for the uplink signal.

In the example configurations presented previously, the TPC resources and parameters may be optionally configured. They may not need to be explicitly configured if group DCI for TPC commands is not utilized. For DCI dedicated to a UE to trigger a PUSCH or a SRS or schedule a PDSCH with ACK or NACK in a PUSCH and so on, the TPC command bit(s) is already included as defined in the technical standard specifications. However, to enable greater flexibility, group DCI for TPC commands may be used. In such a situation, a UE may need to be configured with TPC RNTI(s) for the DCI and bit locations within the DCI.

The loop states may also be optionally configured. They may not be explicitly configured for absolute TPC commands. In situations for TPC commands with accumulation, the loop states may sometimes also need not be configured, if one TPC command configuration is associated with one type of uplink transmission and one common loop state is to be used for all such transmissions, for example. However, multiple loop states may be specified, even for the same TPC commands, and the accumulation performed separately for each loop state. Each loop state may be maintained by the UE and will be updated until the next TPC command associated with the loop or loop state is received (the next TPC command may be specified in RRC, MAC, or PHY signaling or in technical standard specifications.

Multiple TPC commands with different parameters or configurations may be assigned to the same loop or loop state to reduce loop overhead. Multiple loops or loop states may be assigned one set of TPC command parameters or configurations to reduce TPC overhead. Although the relation between loop or loop state and their associated TPC command(s) may be complicated and many different mappings exist, throughout the example embodiments presented herein, loop or loop state and their associated TPC command(s) are used interchangeably for brevity unless otherwise specified. The loop or loop state and their associated TPC command(s) may be referred to as closed-loop PC parameters.

An example embodiment related to configuring multiple power control settings may be as follows:

The network configures multiple sets of downlink RSs and transmits the downlink RSs for the UE to receive. Access nodes of the network may also send SSs (which may not require configuration signaling) and the UE receives the SSs. The downlink RSs and SSs comprise an element of the power control settings.

The network configures one or more uplink transmissions and their associated resources. The one or more uplink transmissions and associated resources comprise another element of the power control settings.

The network configures resources and parameters for multiple closed-loop TPC commands. The network configures multiple sets of parameters for semi-static power control. In order to limit complexity, a maximum number of sets of semi-static or open-loop power control parameters may be set to a first pre-defined limit, and a maximum number of sets of dynamic or closed-loop power control parameters may be set to a second pre-defined limit, with the second pre-defined limit being the same or different from the first pre-defined limit. It is noted that the second pre-defined limit may be smaller than the first pre-defined limit because it may be more complex to maintain multiple power control loops.

A power control setting may be configured by specifying: one or more uplink elements configured to the UE, one or more sets of open-loop power control parameters to the UE, optionally one or more closed-loop power control parameters to the UE, and parameters or configurations to obtain one PL estimate to the UE, where the PL is associated with a RSRP from a downlink RS. Multiple power control settings may be configured.

To simplify the power control settings or signaling thereof: the downlink RSs (or associated RSRP measurements) may be indexed, the open-loop power control parameters may be indexed, the closed-loop power control parameters may be indexed, and the indices are used in the power control setting configuration. The power control setting may also be indexed. The uplink signal, transmission, or resources may also be indexed and used in the configuration of a power control setting. Alternatively, indexing may not be used for the different elements, but the power control setting is configured for each of the different elements.

An example embodiment related to configuring multiple power control settings may be as follows:

The network configures multiple sets of resources and parameters for multiple closed-loop TPC commands and open-loop power control parameters, and a maximum number of sets of power control is fixed to limit complexity. The network configures multiple sets of parameters for semi-static power control potentially different from existing power control configurations, the closed-loop and open-loop power control parameters and configurations may not be specified when configuring uplink transmissions. Instead, the closed-loop and open-loop power control parameters and configurations may be specified separately from uplink signal configurations, and the closed-loop and open-loop power control parameters and configurations are linked to an uplink signal configuration and optionally a RS configuration. When such a linking is provided, a power control setting is defined.

One set of open-loop power control parameters may be linked to one or more sets of RS. One set of closed-loop power control parameters may be linked to one or more sets of RS. One set of open-loop power control parameters may be linked to one or more sets of uplink transmission resources. One set of closed-loop power control parameters may be linked to one or more sets of uplink transmission resources. It is noted that many combinations are possible as enabled by this flexible way of linking elements to define multiple power control settings.

The power control parameter sets may be indexed with unique identifiers, and each of the identifiers is configured for one or more uplink signals and optionally one or more RSs for PL estimates. Here, the downlink RS (or the associated RSRP measurement) may also be indexed. That is, for an uplink signal, if a power control parameter index is provided and optionally a downlink RS or RSRP index is provided, then a power control setting is defined. This may be performed in RRC configuration signalling, MAC signalling, and PHY DCI that is used to trigger (directly or indirectly such as ACK or NACK) the uplink signal or the PHY DCI that is used to provide information about the TPC commands.

In an example embodiment, a DCI may provide information about power control for PUSCH of a UE on a CC, and together with the TPC command for the PUSCH on the CC of the UE, an index of open-loop power control parameter set is specified, and optionally a downlink RS or RSRP index is also specified. This specifies a power control setting for the UE to use for the subsequent or corresponding PUSCH power control. The DCI may be a group DCI (RNTI associated with PUSCH of the UE on the CC, for example) or a UE-specific DCI for an uplink grant. If the PUSCH has multiple types (such as wide-beamwidth PUSCH or narrow-beamwidth PUSCH, first numerology PUSCH or second numerology PUSCH, etc.) then information about the type also needs to be provided in the associated DCI (unless the UE can determine the type based on implicit linking to the downlink RS or RSRP (e.g., wide-beamwidth downlink RS or narrow-beamwidth downlink RS, to which the UE uses wide or narrow beamwidth, respectively, to receive) or RNTI, CRC, DCI format, or the open-loop power control parameter set). This can be similarly applied to PUCCH, SRS, PRACH, or other signals.

In an example embodiment, a DCI may provide information about power control for PUSCH of a UE on a CC, and together with the TPC command for the PUSCH on the CC of the UE, optionally a downlink RS or RSRP index may also be specified. The TPC command is configured to be associated with an open-loop power control parameter set or multiple open-loop power control parameter sets (determining which one to use is described below). This specifies a power control setting for the UE to use for the subsequent or corresponding PUSCH power control. The DCI may be a group DCI (RNTI associated with PUSCH of the UE on the CC, for example) or a UE-specific DCI to for an uplink grant. The network may configure the UE with a number of closed-loop power control parameter sets, and each set is associated with one (or more) open-loop power control parameter sets. Each closed-loop power control parameter set is also associated with one or multiple uplink signals, channels, or resources. When the corresponding DCI is detected by the UE, the UE knows which closed-loop power control parameter set will be applied. If the PUSCH has multiple types (such as wide-beamwidth PUSCH or narrow-beamwidth PUSCH, first numerology PUSCH or second numerology PUSCH, etc.) and if some types are associated with different open-loop power control parameter set(s), then information about the type also needs to be provided in the associated DCI (unless the UE can determine the type based on implicit linking to downlink RS or RSRP (e.g., wide-beamwidth downlink RS or narrow-beamwidth downlink RS, to which the UE uses wide or narrow beamwidth to receive) or RNTI, CRC, DCI format, or the open-loop power control parameter set). If none of these are used to determine which open-loop power control parameter set is to be used, the open-loop power control parameter set index selected by the network for the PUSCH may need to be signalled explicitly. The index may be specific for each closed-loop power control parameter set, in which case different closed-loop power control parameter sets are assigned with their respective sets of open-loop power control parameters, or may be common for all closed-loop power control parameter sets. This can be similarly applied to PUCCH, SRS, PRACH, or other signals.

In an example embodiment, some of the association relations are not specified along TPC commands to help reduce DCI overhead. For example, which PL estimate is to be used for which uplink signal(s) of which type(s) can be specified in RRC or MAC signalling or by technical standards. In an example embodiment, all PUSCH, PUCCH, SRS of a first type (e.g., wide-beamwidth, such as one associated with SS reception or Layer 3 CSI-RS) are to use the same PL estimate (e.g., derived from SS or Layer 3 CSI-RS). In another example embodiment, all PUSCH, PUCCH, SRS of a second type (e.g., narrow-beamwidth, such as one associated with CSI-RS for PUSCH CSI measurement, CSI-RS for beam management, CSI-RS for Layer 1 RSRP) are to use the same PL estimate (e.g., derived from the associated CSI-RS). This can also be viewed as a QCL relation in terms of beamwidth (or level of beamforming, beamforming gain, etc.), that is, uplink signal, channel, or resources are transmitted and received on ports QCLed with antenna ports on which some downlink signal, channel, or resources received and transmitted. In yet another example embodiment, all uplink and downlink signals are grouped into groups, wherein at least one group of uplink or downlink signals is used or can be used before beam management or refining process or without the outcomes of a beam management or refining process, and at least one group of uplink or downlink signals is used based on the outcomes of a beam management or refining process. Signals within one group have a QCL relation in terms of beamwidth. For example, the former group above may all be based on or QCLed to a SS beam, signal, or ports or a Layer 3 CSI-RS beam, signal, or ports of the serving cell. For example, the latter group above may be based on or QCLed to a CSI-RS beam, signal, or ports for CSI measurements or beam management or Layer 1 RSRP, using beams likely narrower than the former group above thanks to the beam management resulting in finer beams for data.

These association or relations may be standardized or configured by the network to the UE, so that they do not have to be signalled to UE using MAC or PHY signalling. If a type of signal (e.g., PUSCH, SRS, or PUCCH) is assigned in more than one group, before the transmission of the signal, the network may need to configure or provide information about which group is selected. An example embodiment utilizes a group index and signals the index. Another example embodiment utilizes QCL or a reference port or transmission relation, specifying that this signal is QCLed or associated with another signal, reference port, or transmission, in uplink or downlink. It is noted that for brevity, the terms "wide" "wider" "narrow" "narrower" beams may be used throughout and can be more precisely understood as above definitions. Similarly, the terms "beams" may be understood as beam pairs (i.e., associated Tx beam and Rx beam pairs) based on context, or sometimes referred to as the beam pair links (BPLs). The beams may also be understood as a spatial QCL assumption linking the specified transmission to another signal (e.g., RS and SS).

In an example embodiment, a first power control setting shares some parameters and configurations of a second power control setting, including $\alpha$, Po, and TPC command, but an additional offset is configured in open-loop power control parameter set. For example, for multiple PUSCHs to the same TRP with different beam-widths, a first PUSCH with narrower beam may be configured as an offset version of a second PUSCH with wider beam. For example, one PUSCH may be associated (e.g., grouped) with a SS or Layer 3 CSI-RS, and a power control setting is specified. Another PUSCH may be associated (e.g., grouped) with another CSI-RS, wherein this CSI-RS is QCLed with the SS or Layer 3 CSI-RS (in terms of average delay and doppler shift, or other weak QCL properties, for example) or as a refined beam of the SS or Layer 3 CSI-RS. The latter PUSCH may be specified to reuse parameters of the power control setting of the former PUSCH, but with an offset applied. The offset can be signalled to the UE from the network, via RRC, MAC, or PHY signalling, such as at the completion of beam management process.

The offset may be based on the difference between the Layer 3 RSRP from the Layer 1 CSI-RS RSRP, or the difference between the Layer 3 PL from the Layer 1 PL calculated by the network (possibly with additional an offset determined by the network, or additional scaling such as $\alpha$ of the PUSCH power control setting). The offset may also be calculated by the UE, based on a difference between the Layer 3 RSRP from the Layer 1 CSI-RS RSRP. The usefulness of the offset may be to regulate the PUSCH power such that the power spectrum density at the receiver side can be more uniform for different PUSCH transmissions.

For another example, open-loop power control parameters are configured for PUSCH with a default (reference) setting, and an additional offset is configured for PUSCH with other settings. In an embodiment, the PUSCH may generally use a default numerology (e.g., 15 kHz at lower frequency or 120 kHz at higher frequency), default waveform (e.g., DFT-S-FDM), default format (e.g., in an uplink slot), default beamwidth, etc., which is configured with the default open-loop power control parameters such as $\alpha$ and $P_o$.

When a different numerology (e.g., 30 kHz at lower frequency or 240 kHz at higher frequency), different waveform (e.g., OFDM), different format (e.g., in a mini-slot, a downlink-uplink slot, etc.), different beamwidth (e.g., wider beamwidth), and so on, is used, additional offsets are applied. The additional offsets may be generally configured in RRC signalling for the different scenarios. The additional offsets may also be signalled in, e.g., MAC or PHY when the numerology, waveform, format, etc., is signalled to be changing. The latter may be more flexible, but requires more signalling overhead in fast time-scales.

In an embodiment, the two types of PUSCH described above (and some other types of signals) may share the same PC setting except for the associated RS, RSRP, or PL. L3 CSI-RS, RSRP, or PL is used for one type, and the other type uses another PL generated from another set of RS or RSRP, such as the CSI-RS for L1. The offset is not needed since it is already accounted for in the PL estimate differences. Which PL to use for a particular PUSCH is specified or determined as described elsewhere in this specification.

In an embodiment, the two types of PUSCH described previously (as well as some other types of signals) may share the same power control setting except for the associated RS, RSRP, or PL. Layer 3 CSI-RS, RSRP, or PL is used for one type of PUSCH, and the other type of PUSCH uses another PL generated from another set of RS or RSRP, such as the CSI-RS for Layer 1. The offset is not needed because it is already accounted for in the PL estimate differences. Which PL to use for a particular PUSCH is specified or determined as described herein.

In an embodiment, the two types of PUSCH described previously (as well as some other types of signals) may share the same power control setting. This results in different receiver side power spectrum densities, but as the network may be aware of this beforehand, and different link adaptation (i.e., MCS levels, ranks, resource allocations, and so forth) can be used to take full advantage.

In an embodiment, one set of closed-loop power control configurations is shared with multiple power control settings. In order for the network to adjust the power for different signals, TPC commands with possibly wider range of power control adjustment values can be used. Accumulative TPC commands may not be suitable for this case, unless one type of signal will be transmitted for a relatively long time without other types of signals transmitted, for example. In more general case, absolute TPC commands should be used for these different types of signals. In order to increase the range of the TPC commands, 2 bits, or even 3 bits (as defined in RAR), or even more may be used. Another way of not increasing the DCI bit width is to signal the UE that a different power control resolution is applied. Multiple sets of power control resolutions, e.g., 2 bits, may be pre-defined and indexed, and one of them is selected for a UE for one or more power control settings. The network can also modify the resolution by signalling a new index in RRC, MAC, or PHY signaling, to a group of UEs or one UE.

The benefit of this is that no additional DCI format needs to be defined but new interpretation of already defined DCI formats is allowed by proper signalling.

In an embodiment, a loop of two TPC command configurations is defined. One of the TPC command configuration is used for accumulative, i.e., it is used to add onto the current loop state and carried to next instances, and the other is not used for accumulation, i.e., it is applied once at the current moment. For example, $f1(i)=f(i-1)+\delta1(i-K)$, and $f2(i)=f1(i)+\delta2(i-K)$, where $\delta1$ is accumulative and $\delta2$ is not, and the UE maintains $f1(i)$ only; and $f2$ is derived from $f1$ and $\delta2$ and is applied to obtain the power control value. This helps multiple types of signals to share the same common loop or loop state, i.e., $f1(i)$ and $\delta2$ can be different for different signals, which avoids unwanted interactions among the signals.

In an embodiment, an access node, TRP, cell, carrier, or bandwidth part that a UE is connected with may not have any SS or Layer 3 CSI-RS seen by the UE. In this case, the UE may have been connected to the TRP, cell, carrier, or bandwidth part via an uplink mobility procedure or a non-persistent SS or Layer 3 CSI-RS configured to the UE, and after the connection establishment, the narrow beam more directly associated with data transmissions is maintained. The UE may then need to only rely on CSI-RS for CSI or beam management, and Layer 1 RSRP or the like for downlink RSRP and PL estimate. In other words, all uplink transmissions associated with this access node, TRP, cell, carrier, or bandwidth part may be narrow-beamwidth, and the uplink power control for these transmissions is based on the corresponding PL estimate.

In an embodiment, an access node, TRP, cell, carrier, or bandwidth part that a UE is connected with, transmits SS or Layer 3 CSI-RS (which may also be configurable and aperiodic to the UE) and is seen by the UE, even after the UE and the TRP have selected narrow beam for higher-rate data transmission. In other words, the UE maintain multiple beams of different beam-widths to the same access node (though the UE may not have to know if they are from the same access node or not, but the UE knows certain QCL relations between them). In this case, uplink transmissions may be in wide-beam or narrow-beam. The wide beams are suitable for beam connection robustness, while the narrow beams are suitable for higher data rate. Therefore, for data transmissions in uplink, narrow beams may be preferred, while for control or other transmissions, wide beams may be preferred. If both are supported for a signal, the beam type needs to be specified as described previously.

However, for SRS used for precise downlink beamforming and rank, MCS, or resource allocation, narrow beams associated with PDSCH may be preferred, otherwise wide beams can be used. The UE can differentiate or be signalled to differentiate these cases and apply power control corresponding. In an embodiment, in a deployment with different signals with different beams (e.g., different beamwidth or different beam directions), each is configured with a power control setting, including open-loop power control parameters, close-loop power control parameters, their respectively downlink RS, etc. In an embodiment, in a deployment with different signals with different beams (e.g., different beamwidth or different beam directions), some signals may be configured with a common set of open-loop power control parameters and close-loop power control parameters, but are configured with their respective and different downlink RS for PL estimates. In an embodiment, in a deployment with different signals with different beams (e.g., different beamwidth or different beam directions), some signals may be configured with a common set of open-loop power control parameters, but are configured with their respective and different close-loop power control parameters and downlink RS for PL estimate. In an embodiment, in a deployment with different signals with different beams (e.g., different beamwidth or different beam directions), some signals may be configured with a common set close-loop power control parameters and downlink RS for PL estimate, but are configured with their respective and different open-loop power control parameters. These and above embodiments may be used for different scenarios and constitute beam-specific power control. Similar designs can be done for numerology-specific, subframe-set-specific, waveform-specific, etc., power control.

In an embodiment, the PL estimate is obtained at the network side. This may be for uplink-based mobility, uplink beacons, carriers, or bandwidth parts without a downlink for a UE, or carriers or bandwidth parts on which uplink or downlink asymmetry is severe or reciprocity does not hold. The uplink power control has to rely on uplink RS for PL estimate at the network side and then signalled to the UE. For initial power control, the UE may be configured with an initial power value to use, and power ramping may be used. The power ramping may be autonomous if the connection has not been established, similar to regular RACH power control, except that regular RACH is configured with initial target power and can perform PL estimate in the downlink, whereas the signal can be configured with initial transmit power. The same power ramping configurations for regular RACH power control can be reused here. It is noted that this signal may be a new special form of RACH. The power ramping may be based on TPC command in the downlink if the connections is not established. An accumulative TPC may be used. In addition, 3 or more bits may be used for the TPC commands. In either case, when the network receives the signal with sufficient accuracy of PL estimate, it can signal the PL value to the UE so that the UE can use the value to set for other power control settings. It is noted that the UE needs to signal the per-port TxP associated with the successful transmission (which is defined as a transmission acknowledged by the network) to the network for PL estimate. Alternatively, the network may signal the RSRP to the UE and the UE determines the PL estimate based on the TxP for the successful transmission. This PL estimate can be combined into other embodiments for the PL estimate element.

In an embodiment, for a UE on a carrier or bandwidth part of an access node, the maximum number of sets of dynamic or closed-loop power control parameters is pre-determined according to technical standards. In 3GPP LTE, the maximum, though not pre-specified, number of sets is effectively 2, one for PUSCH and one for PUCCH or one for SRS on a PUSCH-less carrier. NR can be more complicated, and to set a limit on the complexity, the maximum number of sets may need to be standardized. A possible value is 4 (but other values are possible) to address various forms of transmissions in the uplink. In case this maximum value is not sufficient to provide full flexibility to all forms of uplink transmissions, the UE has to share one set of closed-loop power control parameters (e.g., TPC commands, RNTI, and bit allocations) among multiple power control settings, by means of additional offsets, additional bit(s) in the TPC commands, variable resolutions of the TPC commands, etc., as discussed herein. Similarly, an embodiment for a UE on a carrier or bandwidth part of an access node, the maximum number of sets of semi-static or open-loop power control parameters is pre-determined according to technical standards, though this value could be larger than the maximum number of sets for closed-loop power control.

In an embodiment, the PL estimate is adjusted based on knowledge of the number of Tx antenna ports, panels, layers, etc., used for the RS. If the per-port (or per-layer) TxP is not signalled to the receiver, then the total TxP needs to be signalled, or the number of antenna ports, panels, layers, etc., used for the RS needs to be signalled. Based on this the per-port RSRP and PL can be determined. This may be useful if the number of antenna ports, panels, layers, etc., used for the RS or transmission varies more dynamically than in 3GPP LTE, such as for beam management and different forms of CSI (e.g., precoded CSI-RS with multiple layers). If the total TxP is kept the same for different RS with different numbers of antenna ports, then the per-port TxP varies. In this case, the total TxP and number of ports or layers can be used. If, however, the per-port or layer TxP is kept the same, then the total TxP can vary depending on number of ports, panels, or layers used.

In an embodiment, a UE with analog beamforming (ABF) uses receive antenna ABF corresponding to transmit ABF for receiving downlink RS for PL estimates. The UE may have limited antenna capability in transmitting in the uplink than that in receiving in the downlink. For example, the UE may have 2 RF chains in downlink receive and form a rather narrow receive beam, which is associated with higher antenna gain and hence, an effectively lower PL. However, the UE may have 1 RF chain for uplink transmit and can form wider transmit beams (which does not have to be as wide as initial RACH beam but still wider than its receive beam), leading to lower antenna gains and hence, an effectively higher PL. This could be adjusted based on the UE's estimate of beamforming gain differences in the downlink and uplink and compensate therefor.

However, for some UEs such estimates may not be available. The UE may then extract the receive signal associated with the RF chain associated with the transmission, if the receive signals associated for different RF chains can be separated. In other words, the UE emulates the ABF in the uplink using the ABF in the downlink. This can be generalized to, e.g., different numbers of antennas in the uplink or downlink (which causes differences in antenna beamforming gains). The UE's downlink reception condition is made as similar to the uplink transmission condition, though on antennas or RF chains not used for the uplink, such emulation is not required. It is noted that the emulation here does not require the UE to receive the RS with one antenna or one RF chain; all can be used in the downlink, but signals on the one antenna or RF chain are extracted for PL estimation purposes. This may need to be specified in the technical standards as UE behavior or in testing.

In an embodiment, the SS (e.g., the SSS) TxP is signalled to the UE. In 3GPP LTE, the SS is not used for PL estimates (the CRS is used), and the SS TxP is not signalled (and CRS referenceSignalPower is signalled). In NR, the UE may use SSS (or additionally, the DMRS in associated PBCH) for SS-RSRP measurements, and then generate PL estimate based on SS-RSRP and SS TxP measurements. In an embodiment, the per-RE (i.e., linearly averaged over all SSS REs) TxP of SSS is signalled. If the subcarrier spacing is not fixed in the technical standards, the per-RE TxP or TxP for each unit bandwidth (e.g., 15 KHz in low frequency, even if 30 KHz may be used for a subcarrier) may be signalled. The SSS may be QCLed to the PSS, so the SSS TxP may be specified as being QCLed PSS TxP, or TxP averaged in the SS block including both PSS and SSS. The SSS may be QCLed to the DMRS in PBCH. The DMRS may also be used for SS-RSRP, and if the per-port per-RE TxP of the DMRS is signalled to the UE, the UE can also use the RSRP associated with the DMRS for PL estimate. In case the DMRS per-port per RE power is not the same as the per-RE SSS power, the UE may need to account for the difference in the RSRP determination and the PL estimate, and convert the results obtained from DMRS according to SSS power. In any of the above embodiments, the power may be signalled in PBCH or minimum system information. This can be useful if the RACH configuration is also signalled in PBCH or minimum system information, so that the UE can perform RACH after decoding PBCH or minimum system information. Alternatively, the power may be signalled in other SIB, such as SIB2 as in 3GPP LTE, where RACH configuration and referenceSignalPower are signalled.

FIG. 5 illustrates first example power control parameters 500 for a NR communications system. Power control parameters 500 for a NR communications system is based on 3GPP LTE and may include two elements. A first element 505 includes power control parameters for uplink signals, such as parameters α (alpha), $P_o$, optional TPC resources and RNTI for each uplink signal of a first type (e.g., PUSCH); parameters α (alpha), $P_o$, optional TPC resources and RNTI for each uplink signal of a second type (e.g., PUCCH); and TPC resources and RNTI that are implicit in DCI. First element 505 includes power control parameters for each configured uplink signal. A second element 510 includes parameters for PL measurements, such as parameters for downlink reference signals used for channel measurements, and reference signal transmit power for a CC or beam. Second element 510 includes parameters for PL measurements for each PL measurement to be made.

FIG. 6 illustrates second example power control parameters 600 for a NR communications system. Power control parameters 600 for a NR communications system is based on 3GPP LTE and may include two elements and adds support for beams. A first element 605 includes power control parameters for uplink signals, such as parameters α (alpha), $P_o$, optional TPC resources and RNTI for each uplink signal of a first type (e.g., PUSCH); parameters α (alpha), $P_o$, optional TPC resources and RNTI for each uplink signal of a second type (e.g., PUCCH); parameters α (alpha), $P_o$, optional TPC resources and RNTI for each uplink signal (separately for each beam used); and TPC resources and RNTI that are implicit in DCI. First element 605 includes power control parameters for each configured uplink signal. A second element 610 includes parameters for PL measurements, such as parameters for downlink reference signals used for channel measurements, and reference signal transmit power for a CC or beam. Second element 610 includes parameters for PL measurements for each PL measurement to be made for each beam used.

Figure 7:
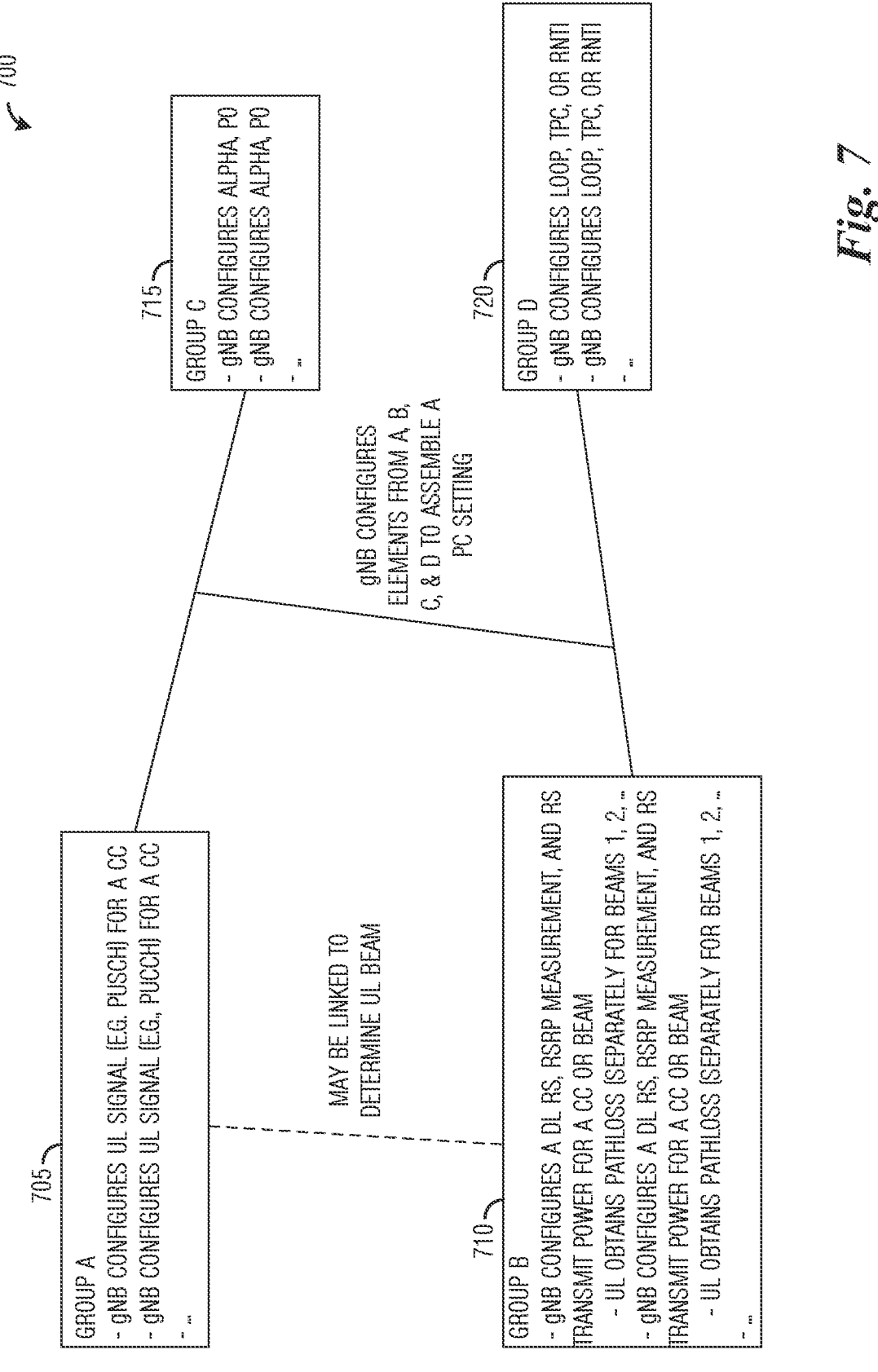
FIG. 7 illustrates third example power control parameters for a NR communications system according to example embodiments described herein.

FIG. 7 illustrates third example power control parameters 700 for a NR communications system. Power control parameters 700 are partitioned into multiple groups that specify power control settings. Elements from each group may be configured to specify a power control setting. As shown in FIG. 7, there are four groups: group A 705, group B 710, group C 715, and group D 720. Group A 705, referred to as uplink signals or resources group, includes parameters specifying uplink signals and may be defined for different CCs or beams. Group B 710, referred to as RS or SS for PL measurement group, includes parameters for PL measurement and may be defined for different CCs or beams. Group C 715, referred to as open-loop configuration or parameter set group, includes power control parameters (including α (alpha), $P_o$ and so on) for different CCs or beams. Group D

720, referred to as closed-loop configuration or parameter set group, includes parameters for loop state, TPC, RNTI, and so on.

Partitioning power control parameters 700 into multiple groups allows for the addition of extra parameters or the addition of additional parameter values for extra signals, beams, etc., in a subset of the groups without impacting the parameters in other groups. The signaling of the parameters may also require less overhead due to a smaller number of parameters or parameter values per group, thereby requiring smaller index values, for example. Differential signaling may also be used to reduce signaling overhead. As an example, for all UEs of a UE group may be signalled a common set of power control parameters from a subset of the groups, while individual UEs of the UE group may only be signalled the power control parameters that are different for each UE instead of having to signal the complete set of power control parameters to each UE of the UE group.

In an embodiment, the elements of the groups of power control parameters 700 may be configured using RRC. In an embodiment, the power control setting may be specified using MAC, PHY, or DCI signaling (implying that there is no pre-defined power control settings) and the DCI provides information dynamically about which power control setting to use. In an embodiment, the DCI provided information about the power control parameters of group C 715 or group D 720 dynamically.

Although the discussion describes the specification of a power control setting by specifying one or more power control parameters from each one of the four groups. However, it is possible to specify a power control setting by specifying power control parameters from a subset of the four groups. As an example, default values may be configured for some of the groups. In such a situation, it is not necessary to specify the default values. In fact, specifying the default values incurs additional signaling overhead. For example, default $\alpha$ and $P_o$ values may be configured, as well as default loop states, TPC, and RNTI. Then, only power control parameters from group A 705 and group B 710 need to be signalled to a UE, and the UE would utilize the default values from group C 715 and group D 720. It is noted that each one of the groups may have default values. Additionally, each group may have more than one default value. In such a situation, a UE would select a default value in accordance with a specified power control parameter from another group, for example.

Figure 8:
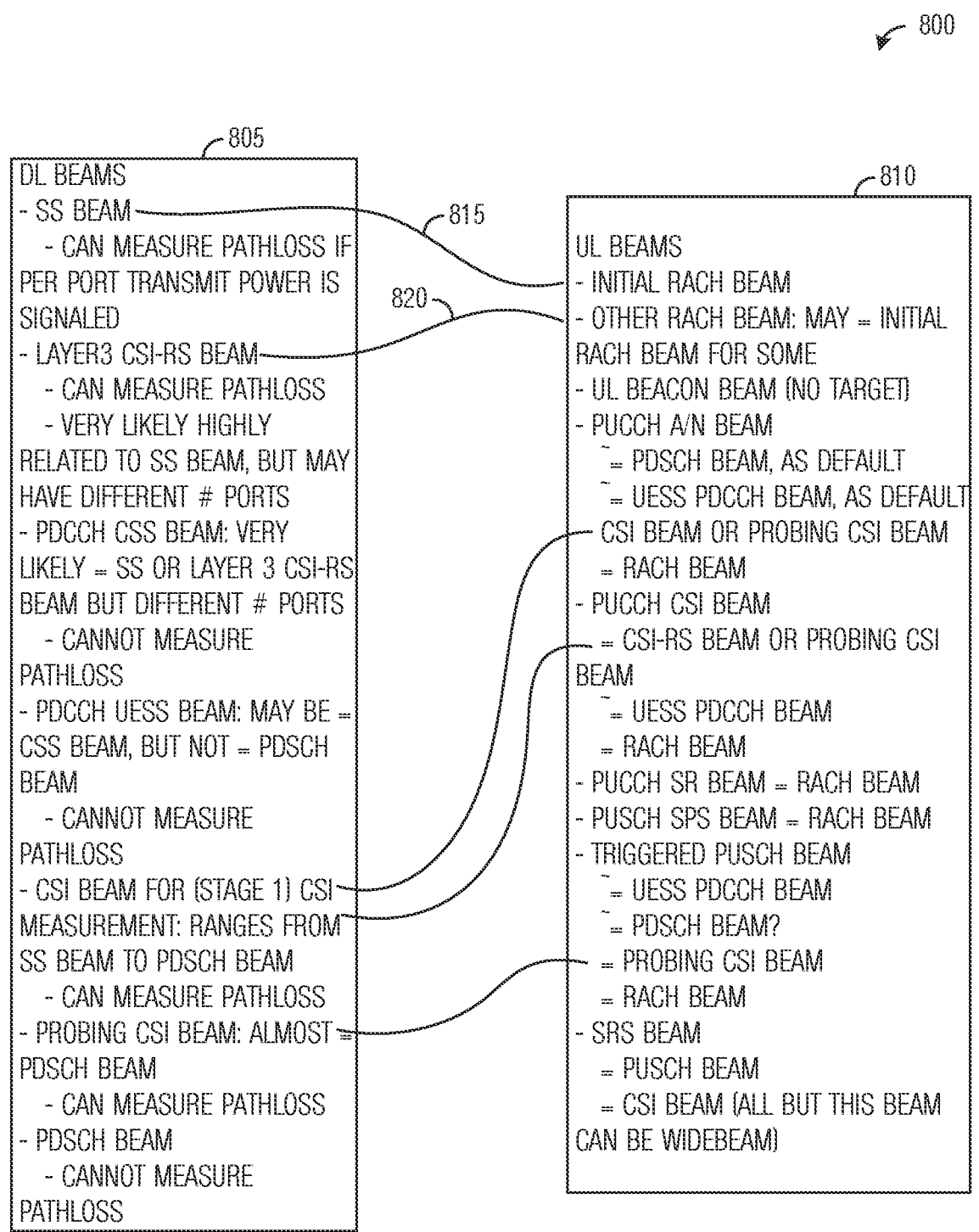
FIG. 8 illustrates relationships between downlink and uplink beams used for power control.

FIG. 8 illustrates relationships 800 between downlink and uplink beams used for power control. As shown in FIG. 8, a relationship $\delta15$ exists between SS beams and initial RACH beams. Similarly, a relationship $\delta20$ exists between Layer3 CSI-RS beams and other RACH beams. The downlink and uplink beams shown in FIG. 8 that have relationships with one another may be referred to as BPLs. These BPLs may also be referred to as QCLed beams or having QCL relationships.

How the transmit power is measured and defined is another aspect of power control and power headroom reports (PHRs). The total radiated power is a conducted metric measuring the amount of power radiated by antennas in all directions. The total radiated power is usually measurable at the antenna connector and may be viewed as the output power of the power amplifier (PA) of the antenna. The total radiated power may also be referred to as UE output power. In order to avoid confusion with a TRP (transmission-reception point), total radiated power is represented by acronym TORP (TOtal Radiate Power). However, in literature, TRP is the typical acronym for total radiated power.

Effective Isotropic Radiate Power (EIRP), or Equivalent Isotropic Radiated Power, is a radiation metric measuring the amount of power radiated by antennas along a single direction, which includes the directivity (directional antenna beamforming gain in that direction). The EIRP cannot be measured at the antenna connector and is generally measured over-the-air (OTA). The peak EIRP, normally the EIRP along the antenna boresight (the axis of maximum gain of a directional antenna and is often the axis of symmetry of the antenna), is obtained with maximum TORP output by the PA of the UE and maximum antenna gain along the boresight (such as by applying a DFT codeword along the boresight), may be determined as $$EIRP_{max\_boresight} = TORP_{max} + G_{max\_boresight} \tag{1}$$

where $TORP_{max}$ is the maximum TORP, and $G_{max\_boresight}$ is the maximum antenna gain along the boresight. Equation (1) is for the boresight direction and full TORP power is used for transmission.

FIG. 9 illustrates a diagram of radiated power 900 for an example directional antenna. A first curve 905 represents $TORP_{max}$ for the antenna and a second curve 910 represents the $EIRP_{antenna}$ envelope for the antenna. It is noted that $TORP_{max}$ is independent of angle relative to the boresight, while the $EIRP_{antenna}$ does vary as the angle changes. As expected, the EIRP of the antenna maximizes at the boresight, $EIRP_{max\_boresight}$. It is noted that although diagram of radiated power 900 is presented as a two-dimensional diagram, an actual diagram for an antenna is three-dimensional.

In general, the total radiated power of the antenna at a particular angle is a sum of the TORP of the antenna and the $G_{antenna}$ at the particular angle. As an example, curve 915 represents the maximum radiated power of the antenna and is a sum of $G_{antenna}$ 917 at the boresight and $TORP_{max}$ 919. As another example, curve 920 represents the maximum radiated power of the antenna at angle $\alpha$ (relative to the boresight) and is a sum of $G_{antenna\_\alpha}$ 922 and $TORP_{max}$ 919. However, the antenna does not have to transmit at maximum power. In such a situation, the actual radiated power at angle $\beta$ (relative to the boresight and is shown as curve 925) is a sum of $G_{antenna\_\beta}$ 927 and $TORP_{actual}$ 929. The radiated powers are expressible as $$EIRP_{max\_\alpha} = TORP_{max} + G_{max\_\alpha} \tag{2}$$

and $$EIRP_{actual\_\beta} = TORP_{actual} + G_{actual\_\beta}. \tag{3}$$

Therefore, in any direction, TORP, EIRP, and antenna gain are related. Furthermore, any one value may be inferred from the other two values. This relationship may be useful in converting EIRP-based quantities to TORP-based quantities and vice versa.

It is noted that the maximum antenna gain along a direction may be generated from precoding using the DFT codeword in that direction. If the analog beamforming is generating by inputting certain bit combinations to the analog phase shifters, a DFT codeword may not be accurately generated. The maximum antenna gain along a direction may not be precisely known to the UE and the maximum EIRP envelope (e.g., curve 910) may appear to have a non-smooth, complicated shape. In an embodiment, some UEs may be able to estimate its antenna gain for a given bit combination to the phase shifters, though with a given estimation error tolerance (e.g., 0.5 dB to 1 dB in a direction, although other values are possible). In an embodiment, some UEs may be able to estimate its antenna gain along all directions, though with a given estimation error tolerance (e.g., 0.5 dB to 1 dB in a direction, although other values are possible). In an embodiment, some UEs may not be able to estimate their actual antenna gains for a given bit combination to the phase shifters or for a given direction, but the UEs may be able to estimate its main antenna gain for a given direction. In an embodiment, some UEs may not be able to estimate their maximum antenna gain for a given direction. In an embodiment, some UEs may not be able to estimate their maximum antenna gain for any given direction, but the UEs may estimate their maximum antenna gain for one or more given directions or store their maximum antenna gains for one or more given directions (such as for radio access network (RAN) 4 or 5 testing purposes, power class definitions, Pcmax definitions, and so on, along the boresight, or 0, 30, 45, or 60 degree tilts from boresight, and so on). In case the boresight or the peak antenna gain is difficult to obtain in practice, the 95-th percentile (or 90-th percentile) maximum antenna gain may be used as the peak boresight gain instead, as presented below.

The peak EIRP may not be readily obtain in practice, as the antenna pattern can be more complicated (e.g., not smooth in spatial directions) but it generally peaks around the boresight direction and reduces when moving away from the boresight. Therefore, in practice, a UE may generate a plurality of maximum EIRPs along a plurality of directions, associated with the maximum EIRP for a plurality of angles. The UE sort the maximum EIRPs to obtain a cumulative distribution function (CDF) and pick a small number of percentile points to represent the overall EIRP CDF. This may be one way to define the power class of UEs, which may be useful for network planning because higher power class UEs can allow for larger cells whereas lower power class UEs require smaller cells.

In 3GPP LTE, the power class and Pcmax for UEs are defined as conducted, i.e., based on TORP. As an illustrative example, UE power class specifications from TS 36.101 is as follows:

| EUTRA Band | Class 3 (dBm) | Tolerance (dB) |
| --- | --- | --- |
| 1 | 23 | +/−2 |
| 2 | 23 | +/−2 |
| 3 | 23 | +/−2 |
| 4 | 23 | +/−2 |

Other examples are similar. Clearly, the UE power class in 3GPP LTE is generally defined as the maximum output power, i.e., maximum TORP, summing up over all antenna connectors in possibly all bands. Likewise, the maximum power reduction (MPR) and additional MPR (A-MPR) are also based on TORP. Furthermore, Pcmax is defined based on TORP and other quantities. In other words, Pcmax is also based on TORP. Additionally, in 3GPP LTE, the uplink power control and PHR use Pcmax. Therefore, uplink power control and PHR are also based on TORP.

However, 3GPP LTE and its definitions for Pcmax, $P_{PUSCH}$, PH, $P_o$, and so on, are for communications operating at lower frequencies, such as below 6 GHz or even below 28 GHz. In higher frequency (HF) communications systems, due to possibly much higher antenna gains, in general, TORP alone may be insufficient in some cases, and EIRP becomes more useful in some cases. Hence, 3GPP RAN4 has adopted EIRP based definitions for power class and Pcmax.

It is noted that if HF uplink power control equations are similar to those of 3GPP LTE, then it is implied that the antenna gains are absorbed into PL, which may be more accurately referred to as coupling loss (CL). In such a situation, the uplink power control should use definitions based on TORP, which are generally accessible by the UE and knowledge of the antenna gain is not needed for uplink power control. Even in 3GPP LTE, the base station's antenna gain and the UE's antenna gain do exist and are absorbed in the PL.

On the other hand, if the HF uplink power control equations are based on EIRP, then the antenna gains of the UE should be excluded from PL. Otherwise, the antenna gains would be double counted. A drawback of this is that the UE needs to have knowledge of the antenna gain for uplink power control. Some UEs may be able to estimate the antenna gains to within a certain tolerance, but other UEs may not be capable of doing so.

Hence, uplink power control based on TORP helps to avoid the need to estimate antenna gains and may be simpler than uplink power control based on EIRP. Similar conclusions may be drawn for uplink PHR. Therefore, TORP-based uplink power control and PHR avoid the need for antenna gain estimation and may be simpler than EIRP-based uplink power control and PHR.

In NR for HF, a UE may maintain one or multiple beam pair links (BPLs). Each BPL is associated with a RSRP and hence a coupling loss value. Unless the antenna gain is estimated by the UE, the PL (excluding the UE antenna gain) is not available to the UE. Hence, assuming that coupling loss (as opposed to PL) is used for power control, multiple BPLs cannot share power control or PHR, i.e., separate power control and PHR are needed per beam, and the UE antenna gain is transparent to the power control and PHR related operations. On the other hand, if PL is obtained by the UE by excluding the antenna gain, then, in principle, multiple BPLs associated with the same access node may be able to share the same power control process and PHR process, but different power control or PHR values are still needed for those BPLs and antenna gains used in power control or PHR. Therefore, separate power control and PHR for each BPL should be adopted. To summarize, uplink power control and PHR are separate for each BPL maintained by a UE.

It is noted that EIRP-based uplink power control or PHR may have some advantages. As an example, it may be more relevant from the point of view of the receiver. Where if the receiver needs to receive a signal with a certain SINR, all the receiver cares about is the EIRP of the transmitter, and how the EIRP is obtained is irrelevant. For example, whether that EIRP is obtained from high TORP plus low antenna gain, or from low TORP plus high antenna gain is irrelevant to the receiver. The transmitter may have more flexibility in setting its TORP and beam. However, if the power control and PHR are separate for each BPL, and each BPL has a fixed antenna gain, then such flexibility may not exist anyway. This further suggests that TORP-based uplink power control and PHR should be used.

According to an example embodiment, a cap value (e.g., an achievable upper limit) for uplink power control and PHR is provided. The cap value may be used to limit the uplink power, either in TORP or EIRP. The cap value may also be used to determine the PHR. As an example, in 3GPP LTE, Pcmax is the cap value. In other words, in 3GPP LTE, the power class and Pcmax are used as a cap value in uplink power control or PHR.

A similar cap value is usable in HF. As an example, the cap value is based on TORP. A TORP-based cap value may be introduced, based on Equations (1) or (2). It is noted that because TORP is not directional, only one TORP cap value is needed and may be applied to any direction. It is also noted that the TORP cap value should be set so that it is an achievable value for the UE. Otherwise, the PHR determined by the UE would not be meaningful and the UE would not be able to precisely implement the power control equation. The uplink power control may still adopt an equation of the form $$P = \min(Pcmax, P'),$$

where P' is determined based on the resource allocation, open or closed-loop parameters, and so on. When P'>Pcmax, then the UE has to transmit at power Pcmax. If the UE cannot achieve Pcmax, then the UE cannot exactly follow the power control equation defined in the technical standard, which may lead to issues. A similar issue is present in PHR. As an example, if the UE reports 10 dB PHR and the access node requests the UE to increase by 9 dB in the next transmission, the UE would not be able to accommodate. Therefore, it is needed to know how to cap the actual transmission power of the UE in terms of TORP.

According to an example embodiment, a UE-specific maximum TORP cap value achievable by a UE is provided for uplink power control and PHR. The UE-specific maximum TORP cap value helps to ensure that the EIRP-based power class and Pcmax definitions can be made compatible with power control and PHR for all possible types of transmissions, provided that the UE-specific maximum TORP cap value is actually achievable by the UE, or alternatively, that the antenna gain associated with the maximum EIRP in a particular direction is achievable by the UE. If the Pcmax, as defined in 3GPP RAN4, is achievable by the UE, then Pcmax is also the UE-specific maximum TORP cap value. However, Pcmax may be defined to be a generic value for a type of UEs and may not always be achievable by a particular UE. In such a situation, the UE-specific maximum TORP cap value is another value that is lower than Pcmax.

In an embodiment, suppose that the power class for a UE for any transmission bandwidth with the channel bandwidth for non-CA and non-uplink-MIMO operation is defined as a 90-th percentile point of EIRP (denoted $P_{Powerclass\_90\%}$, EIRP or simply $P_P$), and the associated antenna gain is estimated by the UE is $G_{90\%}$, then the $P_{cmax,c}$ of EIRP for a serving cell c is set within the bounds expressible as:

$$P_{CMAX\_L,c} \leq P_{CMAX,c} \leq P_{CMAX\_H,c}$$

with $$P_{CMAX\_L,c} = \text{MIN}\,\{P_{EMAX,c} - \Delta T_{C,c},$$

$$P_P - \text{MAX}\,(MPR_c + A{-}MPR_c + \Delta T_{IB,c} + \Delta T_{C,c} + \Delta T_{ProSe},\; P{-}MPR_c)\},$$

$$P_{CMAX\_H,c} = \{P_{EMAX,c}, P_P\}.$$

where $P_{EMAX,c}$ is a specified maximum power value for serving cell c, $P_P$ is the maximum UE power without taking the tolerance specified in 3GPP TS 36.101 Table 6.2.2-1 into consideration, $MPR_c$ and A-$MPR_c$ are values specified in 3GPP TS 36.101 subclauses 6.2.3 and 6.2.4, $\Delta T_{IB,c}$ is an additional tolerance for serving cell c as specified in 3GPP TS 36.101 Table 6.2.5-1 ($\Delta T_{IB,c}$=0 dB otherwise), $\Delta T_{C,c}$ is another tolerance and is equal to 1.5 dB when NOTE 2 in 3GPP TS 36.101 Table 6.2.2-1 applies and is equal to 0 dB when NOTE 2 in 3GPP TS 36.101 does not apply, $\Delta T_{ProSe}$=0.1 dB when the UE supports ProSe Direct Discovery or ProSe Direct Communications in corresponding E-UTRA ProSe band, $\Delta T_{ProSe}$=0 dB otherwise, and P-$MPR_c$ is a maximum allowed output power reduction. Additionally, $\Delta P_{PowerClass}$=3 dB for a power class 2 capable UE operating in Band 41, when information about P-max of 23 dBm or lower is provided or if the uplink or downlink configuration is 0 or 6 in the cell; otherwise, $\Delta P_{PowerClass}$=0 dB. As shown above, Pcmax, based on EIRP, is bound by $P_P$, MPR values, and other tolerances or adjustments. It is noted that the power class definition may include other CDF points of EIRP, but only the highest EIRP value is used for the definition of Pcmax. UE may then derive $Pcmax_{TORP,C}$ as $$Pcmax_{TORP,C} = Pcmax_{,C} - G_{90\%}.$$

As an illustrative example, the power control equation for PUSCH is expressible as $$P_{PUSCH,c}(i) = \min$$

$$\left\{ \begin{array}{l} P_{CMAX,TORP,c}(i), \\ 10 \log_{10}(M_{PUSCH,c}(i)) + P_{O\_PUSCH,c}(j) + \alpha_c(j) \cdot PL_c + \Delta_{TF,c}(i) + f_c(i) \end{array} \right\}.$$

As another illustrative example, the power headroom equation is expressible as $$PH_{type1,c}(i) = P_{CMAX,TORP,c}(i) -$$

$$\{10 \log_{10}(M_{PUSCH,c}(i)) + P_{0\_PUSCH,c}(j) + \alpha_c(j) \cdot PL_c + \Delta_{TF,c}(i) + f_c(i)\}.$$

According to an example embodiment, the maximum EIRP constraints, as set in regulatory requirements, are also incorporated. The maximum EIRP constraints may be incorporated in Pcmax or in the power control equations. If the maximum EIRP constraints are incorporated in Pcmax, then Pcmax of EIRP may be updated as $$P_{CMAX\_L,c} \leq P_{CMAX,c} \leq P_{CMAX\_H,c}$$

with $$P_{CMAX\_L,c} = \text{MIN}\,\{P_{EMAX,c} - \Delta T_{C,c},$$

$$P_P - \text{MAX}\,(MPR_c + A{-}MPR_c + \Delta T_{IB,c} + \Delta T_{C,c} + \Delta T_{ProSe},\; P{-}MPR_c)\},$$

$$P_{CMAX\_H,c} = \text{MIN}\,\{P_{EMAX,c}, P_{PowerClass}, P_{EIRP,upper}\}.$$

The remainder of the power control or PHR design follows in a similar manner. It is noted that $Pcmax_{TRP,C}$ may be conservative in nature (i.e., lower than necessary), because a too stringent of an upper limit is placed on UE TORP in directions that are far away from the boresight. Incorporating the power control equation, the transmit power is expressible as $$P_{PUSCH_c}(i) = \min$$

$$\begin{cases} P_{CMAX,TORP,c}(i), \\ P_{EIRP,upper} - G, \\ 10 \log_{10}(M_{PUSCH,c}(i)) + P_{O\_PUSCH,c}(j) + \alpha_c(j) \cdot PL_c + \Delta_{TF,c}(i) + f_c(i) \end{cases}, 5$$

where G may be the actual antenna gain along the direction of the uplink transmission, $G_{actual}$, which would require the UE to estimate the actual antenna gain in the direction. Alternatively, G may be an antenna gain known to the UE, such as $G_{90\%}$, which would also lead to a conservative (lower than necessary) uplink transmission power. For some UEs, it may be feasible to determine a range of angles (or a set of beamformers, phase shift bit combinations, or so on) that would exceed $P_{EIRP,upper}$ if full TORP is used, and the UEs determine the maximum allowed TORP for those angles during actual transmissions. For other angles, the maximum TORP may be used. In other words, $$Pcmax_{TORP,a,c} = \min (Pcmax_C - G_{max,a})$$

or $$Pcmax_{TORP,a} = \min (Pcmax - G_{max,a}).$$

It is noted that with the c subscript, Pcmax is applicable to a specific carrier, whereas, without the c subscript, Pcmax is applicable to the sum of all carriers.

It is noted that in addition to a UE's power class, the antenna gain value G, or more specifically, $G_{90\%}$ or $G_{max,\alpha}$ may be a quantity known to the UE. Alternatively, G may be one of the quantities defined in the power class of the UE. Because the antenna gain, EIRP, and TORP are related and one may be derived from the other two, $Pcmax_{TORP}$ may be made available to the UE instead and the antenna gain value is then not needed for power control or PHR. However, the power class (including the tolerance) may be defined so that the regulatory EIRP would not be exceeded even with the greatest antenna gain and maximum TORP. In such a situation, the parameter $P_{EIRP,upper}$ needs to appear in Pcmax or the uplink power control or PHR equations.

The previously presented expressions are for power class with 90-th percentile EIRP and associated antenna gain as shown. However, if an X-th percentile (or peak or mean) EIRP and associated antenna gain are provided and if there is no higher EIRP point defined, then these values may be used to define the Pcmax. In other words, the $P_P$ in the above expressions are replaced by $P_{Powerclass,X~\%,~EIRP}$, and $Pcmax_{TORP} = P_{cmax,c} - G_{X~\%}$, and the expressions would be evaluated as described.

Additionally, if the X-th percentile (or peak or mean) EIRP are provided and there is no higher EIRP point defined. Furthermore, if the antenna gain known by the UE is G' and is not associated with the EIRP value, then the $P_P$ in the above expressions are replaced by $P_{Powerclass,~X~\%,~EIRP}$, and $Pcmax_{TORP} = P_{cmax,c} - G'$, and the expressions would be evaluated as described. It is noted that if $G' < G_{X~\%}$, the uplink power control would be conservative, while if $G' > G_{X~\%}$ then aggressive uplink power control may be used (when aggressive power control does not cause issues (such as violating regulatory bounds) then it may be allowed, else aggressive power control is not allowed).

The example embodiments for EIRP-based uplink power control or PHR presented herein are described using the PUSCH. However, the example embodiments presented herein are operable with other uplink channels, such as SRS, RACH, PUSCH and PUCCH, and so on. Therefore, the discussion of EIRP-based uplink power control or PHR using only PUSCH should not be construed as being limiting on the scope or spirit of the example embodiments.

Additionally, the example embodiments for EIRP-based uplink power control or PHR presented herein are described in an environment with one carrier and a single beam, without uplink CA, uplink MIMO, uplink dual connectivity (DC). However, the example embodiments presented herein are operable in deployments that support uplink CA, uplink MIMO, uplink DC, multiple panels at the UE, wide carriers with one or more bandwidth parts (BWPs), multiple beams, and so on. In such a situation, the power class may be defined to include all bands, all panels, all cell groups (or TRP groups), MIMO capabilities, and so on. The Pcmax may be defined for all bands and bounded by the power class, and Pcmax,c may be defined for each carrier or BWP and also bounded by the power class. Example expressions for Pcmax,c include $$P_{CMAX\_L} = \text{MIN} \{ 10 \log_{10} \sum \text{MIN} [p_{EMAX,c}/(\Delta t_{C,c}),$$
$$p_{PowerClass}/(pmpr_c \cdot a - mpr_c \cdot \Delta t_{c,c} \cdot \Delta t_{IB,c} \cdot \Delta t_{ProSe}),$$
$$p_{PowerClass}/pmpr_c], P_{PowerClass} \}$$
$$P_{CMAX\_L,c} \leq P_{CMAX,c} \leq P_{cMAX)\_H,c} \text{ with}$$
$$P_{CMAX\_L,c} = \text{MIN} \{ P_{EMAX,c} - \Delta T_{C,c},$$
$$P_P - \text{MAX} (MPR_c + A - MPR_c + \Delta T_{IB,c} + \Delta T_{C,c} + \Delta T_{ProSe}, P - MPR_c) \}.$$

The above expressions for Pcmax,c are based on EIRP. In order to determine Pcmax expressions based on TORP, a conversion is applied. Example conversions include $$Pcmax_{TORP} = G_{90\%}$$
$$Pcmax_{TORP,C} = Pcmax,c - G_{90\%}.$$

According to an example embodiment, in power control or PHR, $P_{cmax,TORP,c}$ is used for each CC or BWP. Furthermore, an overall $Pcmax_{TORP}$ is used to determine if the UE has to scale down its power. Remaining aspects of power control or PHR follows as specified in 3GPP LTE. Clearly, other than EIRP regulatory requirements, the maximum output power of a UE, i.e., maximum TORP, is the limit (in other words, the cap value) over all carrier resources. Therefore, power scaling, power control, and PHR, should be based on the cap value.

According to an example embodiment, in a communications system supporting DC and the like, a per cell group Pcmax (denoted Pcmax,c,i) is defined and is bounded by the power class. In such a situation, Pcmax based on TORP, $P_{cmax,TORP,c,i}$, may be defined by taking away $G_{90\%}$, and the expressions would be evaluated as described. Other than EIRP regulatory requirements, the maximum output power of a UE, i.e., maximum TORP, is the limit (in other words, the cap value) over all carrier resources of all cell groups, as well as power scaling, power control, and PHR, should be based on the cap value. This is also applicable to situations with multiple beam transmissions to multiple TRPs using one or more antenna panels.

According to an example embodiment, when the UE supports both HF and LF, the HF power class is defined based on EIRP and the LF power class is defined based on TORP. However, each can operate independently if the regulatory requirements are independent for HF and LF. As an example, a regulatory requirement for LF requires that LF not exceed 23 dBm TORP while a regulatory requirement for HF requires that HF not exceed 45 dBm EIRP. In such a situation, the UE determines the power control or PHR separately or independently for HF and LF. If there is a total EIRP constraint, however, the UE also needs to estimate its LF antenna gain, hence, obtaining LF EIRP. The maximum LF antenna gain may be used to simplify the implementation because LF antenna gain variations are generally smaller. If the total EIRP constraint is violated, the LF and HF TORP may be reduced by the same amount of dB to meet the constraint. In other words, the power control or PHR for HF or LF may still be based on a single TORP value.

Figure 10A:
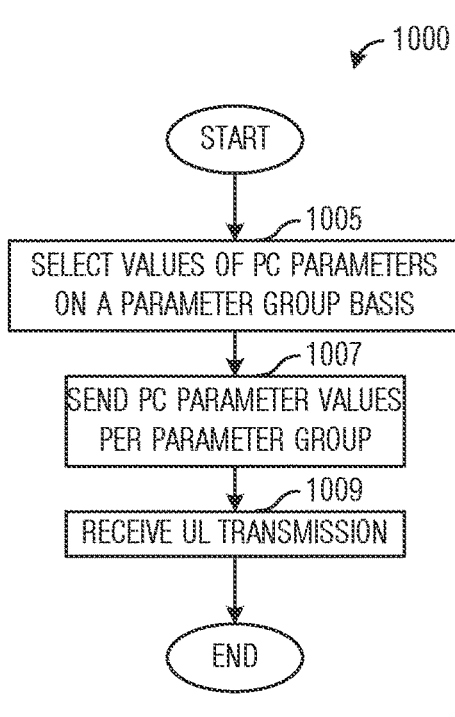
FIG. 10A illustrates a flow diagram of example operations occurring in an access node communicating with a UE with a power control setting specified using groups of power control parameters according to example embodiments described herein.

FIG. 10A illustrates a flow diagram of example operations 1000 occurring in an access node communicating with a UE with a power control setting specified using groups of power control parameters. Operations 1000 may be indicative of operations occurring in an access node as the access node communicates with a UE with a power control setting specified using groups of power control parameters.

Operations 1000 begin with the access node specifying a power control setting by selecting values of power control parameters for the groups of power control parameters (block 1005). The access node may select values for power control parameters for each group of power control parameters or for a subset of the groups of power control parameters. The access node may select values for one or more power control parameter of a particular group of power control parameters. The access node sends the power control parameter values of the power control setting to the UE on a per group basis (block 1007). As an example, the power control parameters of a single group may be arranged in a list form and referenced using an index, and the access node sends an index to a power control parameter and a value of the power control parameter. In a situation where there are more than one values or more than one power control parameters, the access node may repeat the index and power control parameter value for each. The access node receives an uplink transmission from the UE (block 1009). The uplink transmission is sent by the UE in accordance with the power control setting sent by the access node.

Figure 10B:
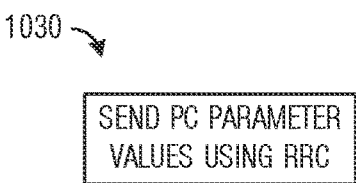
FIGS. 10B-10D illustrate example techniques used by an access node to send the power control parameter values according to example embodiments described herein.

FIG. 10B illustrates a diagram 1030 of a first example technique used by an access node to send the power control parameter values. Diagram 1030 illustrates an example implementation of block 1007 of FIG. 10A. Access node sends the power control parameter values using RRC signaling.

Figure 10C:
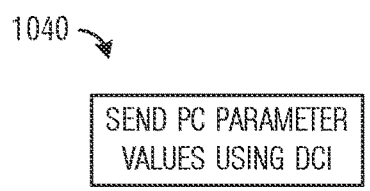

FIG. 10C illustrates a diagram 1040 of a second example technique used by an access node to send the power control parameter values. Diagram 1040 illustrates an example implementation of block 1007 of FIG. 10A. Access node sends the power control parameter values using DCI signaling.

Figure 10D:
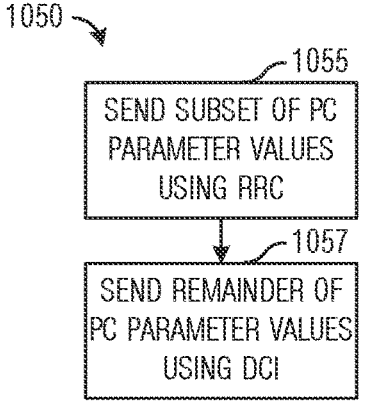

FIG. 10D illustrates a diagram 1050 of a third example technique used by an access node to send the power control parameter values. Diagram 1050 illustrates an example implementation of block 1007 of FIG. 10A. Access node sends a subset of the power control parameter values using RRC signaling (block 1055) and a remainder of the power control parameter values using DCI signaling (block 1057). As an example, the power control setting may be specified using MAC, PHY, or DCI signaling (implying that there is no pre-defined power control settings) and the DCI provides information dynamically about which power control setting to use. In an embodiment, the DCI provided information about the power control parameters of group C 715 or group D 720 dynamically, while the power control parameters of group A 705 and group B 710 are signalled using MAC, PHY, or DCI signaling.

Figure 11:
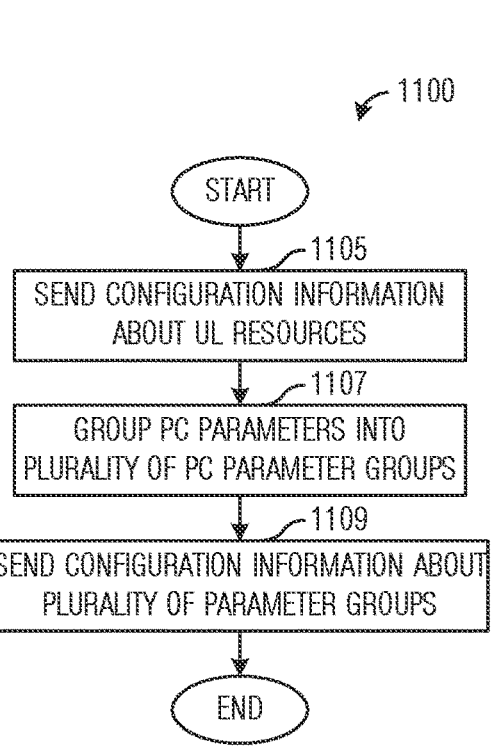
FIG. 11 illustrates a flow diagram of example operations occurring in an access node configuring groups of power control parameters according to example embodiments described herein.

FIG. 11 illustrates a flow diagram of example operations 1100 occurring in an access node configuring groups of power control parameters. Operations 1100 may be indicative of operations occurring in an access node as the access node configures groups of power control parameters to UEs.

Operations 1100 begin with the access node sending configuration information about uplink resources (block 1105). The configuration information sent by the access node specifies uplink resources that have been allocated to the UE for uplink transmissions, for example. The access node groups the power control parameters into a plurality of groups (block 1107). As an illustrative example, the power control parameters are grouped into four groups: group A, group B, group C, and group D. Group A including power control parameters related to uplink signals or resources, group B including power control parameters related to RS or SS for PL measurement, group C including power control parameters related to open-loop configuration or parameter set, and group D including power control parameters related to closed-loop configuration or parameter set. The access node sends configuration information about the plurality of groups (block 1109). The configuration information about the plurality of groups may be sent using RRC signaling, for example.

Figure 12:
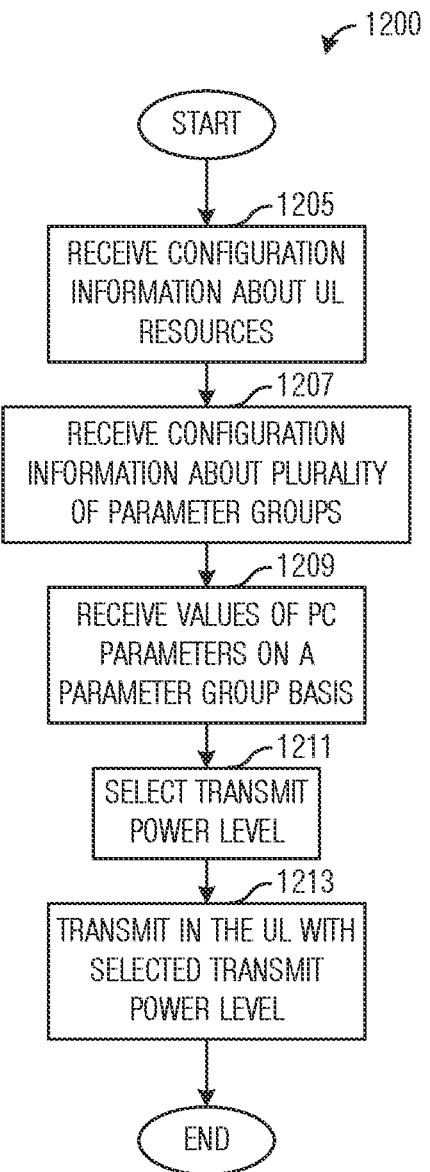
FIG. 12 illustrates a flow diagram of example operations occurring in a UE communicating with an access node with a power control setting specified using groups of power control parameters according to example embodiments described herein.

FIG. 12 illustrates a flow diagram of example operations 1200 occurring in a UE communicating with an access node with a power control setting specified using groups of power control parameters. Operations 1200 may be indicative of operations occurring in a UE as the UE communicates with an access node with a power control setting specified using groups of power control parameters.

Operations 1200 begin with the UE receiving configuration information about uplink resources (block 1205). The configuration information sent by the access node specifies uplink resources that have been allocated to the UE for uplink transmissions, for example. The UE receives configuration information about a plurality of groups of power control parameters (block 1207). The plurality of groups of power control parameters collectively specify power control settings and may be grouped by the access node or a technical standard. The configuration information may be received in RRC signaling. The UE receives power control parameter values (block 1209). The power control parameter values may be received on a parameter group basis, meaning that the UE may receive an index into a group and a value for the power control parameter associated with the index. The UE may receive indices and values for power control parameters from each group before it receives indices and values for power control parameters from another group. It is noted that power control parameters from some groups may not be received, leaving the UE to use default values for those power control parameters. The UE selects a transmit power level (block 1211). The transmit power level is selected in accordance with the power control setting (as specified by the power control parameter values received from the access node) and a count related to a number of times that the UE has attempted to make the transmission. As an example, the UE performs one or more PL estimates based on downlink signals (such as a downlink RS (e.g., CSI-RS), SS, DMRS, and so on), as specified by the power control parameter values provided by the access node. The UE also maintains one or more closed-loop power control states, as specified by the power control parameter values provided by the access node. The PL estimate(s) and the closed-loop power control state(s) are used in selecting the transmit power level. Furthermore, open-loop power control parameters (e.g., α (alpha) and Po) are also used in selecting the transmit power level. The UE transmits in the uplink with the power level selected in block 1211 (block 1213).

FIG. 13 illustrates a flow diagram of example operations 1300 occurring in an access node communicating with a UE using power control specified by groups of power control parameters. Operations 1300 may be indicative of operations occurring in an access node as the access node communicates with a UE using power control specified by groups of power control parameters.

Operations 1300 begin with the access node sending configurations of one or more uplink resources to the UE (block 1305). The one or more uplink resources are allocated to the UE to allow the UE to make uplink transmissions, such as SRSs, PUCCH, or PUSCH. The access node sends configurations of one or more groups of power control parameters (block 1307). As an example, the access node may send configurations of downlink signals, open-loop power control parameters, or close-loop power control parameters. The access node sends a power control configuration (block 1309). The power control configuration may specify power control parameter values from one or more of the one or more groups of power control parameters, for example. The access node receives an uplink transmission from the UE (block 1311). The uplink transmission from the UE may be transmitted in accordance with the power control configuration provided by the access node. The transmit power of the uplink transmission is also in accordance with a pathloss between the access node and the UE, which is determined based on downlink signals transmitted by the access node.

FIG. 14 illustrates a flow diagram of example operations 1400 occurring in a UE communicating with an access node using power control specified by groups of power control parameters. Operations 1400 may be indicative of operations occurring in a UE as the UE communicates with an access node using power control specified by groups of power control parameters.

Operations 1400 begin with the UE receiving configurations of one or more uplink resources from the access node (block 1405). The one or more uplink resources are allocated to the UE to allow the UE to make uplink transmissions, such as SRSs, PUCCH, or PUSCH. The UE receives configurations of one or more groups of power control parameters (block 1407). As an example, the UE may receive configurations of downlink signals, open-loop power control parameters, or close-loop power control parameters. The UE receives a power control configuration (block 1409). The power control configuration may specify power control parameter values from one or more of the one or more groups of power control parameters, for example. The UE sends an uplink transmission to the access node (block 1411). The uplink transmission from the UE may be transmitted in accordance with the power control configuration provided by the access node. The transmit power of the uplink transmission is also in accordance with a pathloss between the access node and the UE, which is determined based on downlink signals transmitted by the access node.

Figure 15:
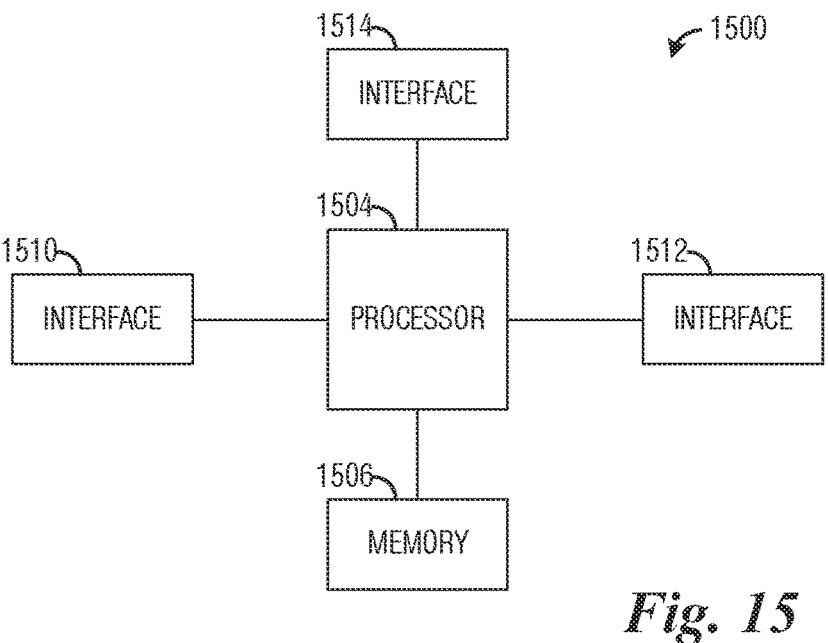
FIG. 15 illustrates a block diagram of an embodiment processing system for performing methods described herein, which may be installed in a host device.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations or other processing related tasks, and the memory 1506 may be any component or collection of components adapted to store programming or instructions for execution by the processor 1504. In an embodiment, the memory 1506 includes a non-transitory computer readable medium. The interfaces 1510, 1512, 1514 may be any component or collection of components that allow the processing system 1500 to communicate with other devices or components or a user. For example, one or more of the interfaces 1510, 1512, 1514 may be adapted to communicate data, control, or management messages from the processor 1504 to applications installed on the host device or a remote device. As another example, one or more of the interfaces 1510, 1512, 1514 may be adapted to allow a user or user device (e.g., personal computer (PC), etc.) to interact or communicate with the processing system 1500. The processing system 1500 may include additional components not depicted in FIG. 15, such as long term storage (e.g., non-volatile memory, etc.).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 16:
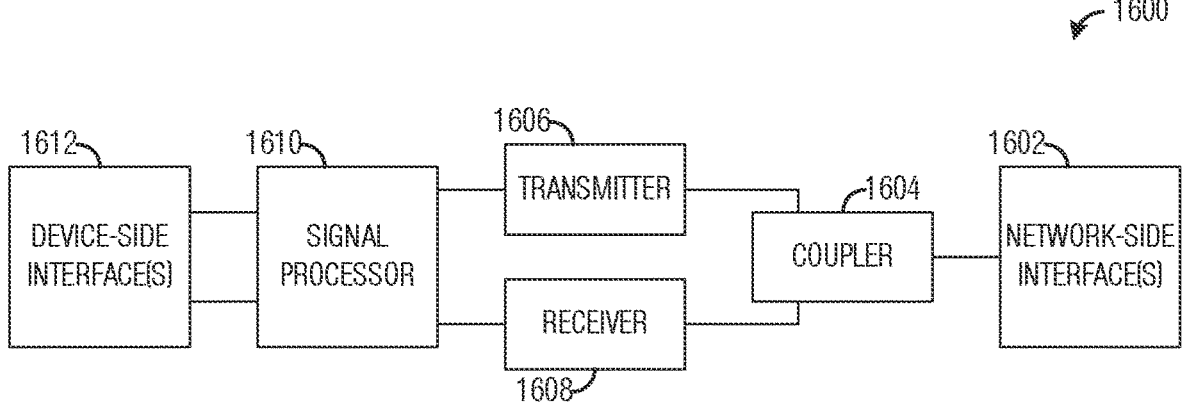
FIG. 16 illustrates a block diagram of a transceiver adapted to transmit and receive signaling over a telecommunications network.

In some embodiments, one or more of the interfaces 1510, 1512, 1514 connects the processing system 1500 to a transceiver adapted to transmit and receive signaling over the telecommunications network. FIG. 16 illustrates a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1300, local area network (LAN) ports, etc.).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), 5G, 5G NR, etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 comprises one or more antenna or radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems or transceivers may utilize all of the components shown, or a subset of the components, and levels of integration may vary from device to device.

Figure 17:
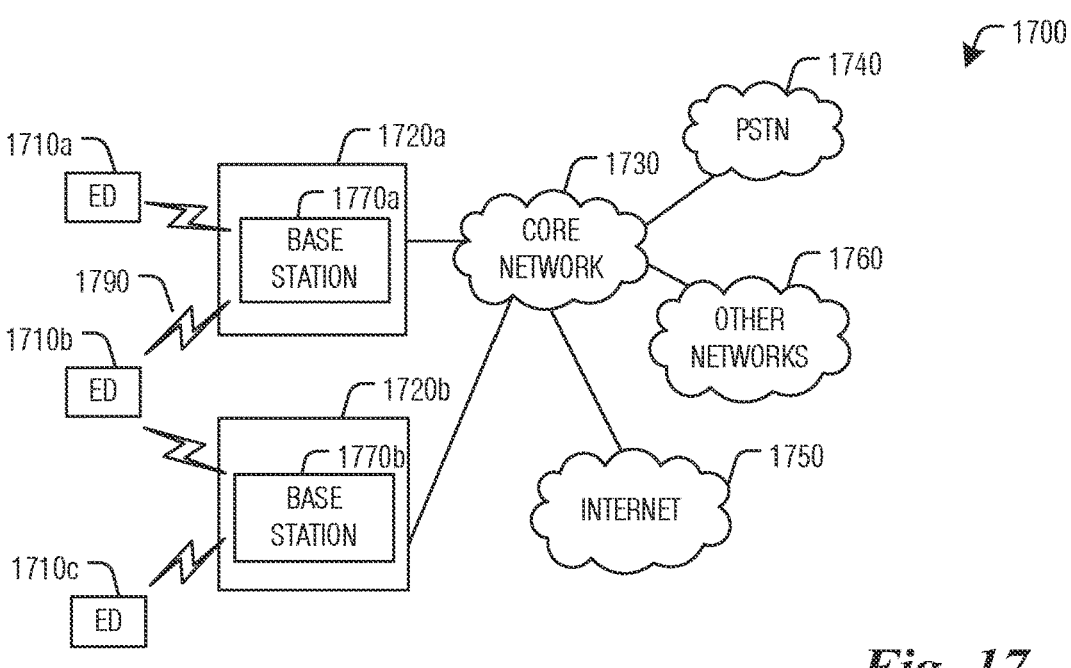
FIG. 17 illustrates an example communication system.

FIG. 17 illustrates an example communication system 1700. In general, the system 1700 enables multiple wireless or wired users to transmit and receive data and other content. The system 1700 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1700 includes electronic devices (ED) 1710a-1710c, radio access networks (RANs) 1720a-1720b, a core network 1730, a public switched telephone network (PSTN) 1740, the Internet 1750, and other networks 1760. While certain numbers of these components or elements are shown in FIG. 17, any number of these components or elements may be included in the system 1700.

The EDs 1710a-1710c are configured to operate or communicate in the system 1700. For example, the EDs 1710a-1710c are configured to transmit or receive via wireless or wired communication channels. Each ED 1710a-1710c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1720a-1720b here include base stations 1770a-1770b, respectively. Each base station 1770a-1770b is configured to wirelessly interface with one or more of the EDs 1710a-1710c to enable access to the core network 1730, the PSTN 1740, the Internet 1750, or the other networks 1760. For example, the base stations 1770a-1770b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1710a-1710c are configured to interface and communicate with the Internet 1750 and may access the core network 1730, the PSTN 1740, or the other networks 1760.

In the embodiment shown in FIG. 17, the base station 1770a forms part of the RAN 1720a, which may include other base stations, elements, or devices. Also, the base station 1770b forms part of the RAN 1720b, which may include other base stations, elements, or devices. Each base station 1770a-1770b operates to transmit or receive wireless signals within a particular geographic region or area, sometimes referred to as a "cell." In some embodiments, multiple-input multiple-output (MIMO) technology may be employed having multiple transceivers for each cell.

The base stations 1770a-1770b communicate with one or more of the EDs 1710a-1710c over one or more air interfaces 1790 using wireless communication links. The air interfaces 1790 may utilize any suitable radio access technology.

It is contemplated that the system 1700 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1720a-1720b are in communication with the core network 1730 to provide the EDs 1710a-1710c with voice, data, application, Voice over Internet Protocol (VOIP), or other services. Understandably, the RANs 1720a-1720b or the core network 1730 may be in direct or indirect communication with one or more other RANs (not shown). The core network 1730 may also serve as a gateway access for other networks (such as the PSTN 1740, the Internet 1750, and the other networks 1760). In addition, some or all of the EDs 1710a-1710c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1750.

Although FIG. 17 illustrates one example of a communication system, various changes may be made to FIG. 17. For example, the communication system 1700 could include any number of EDs, base stations, networks, or other components in any suitable configuration.

Figure 18A:
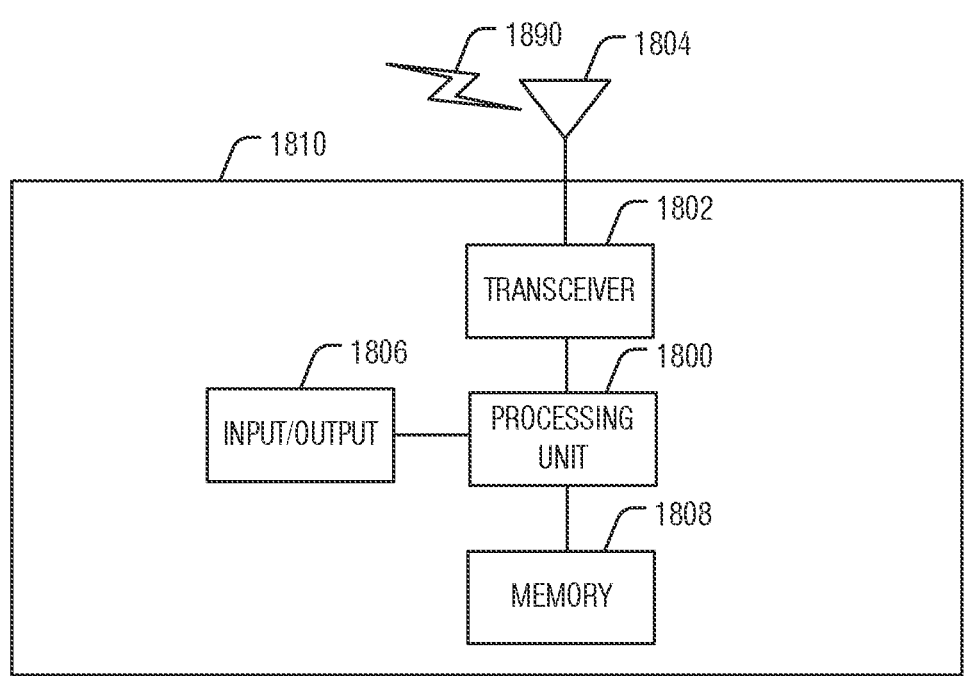
FIGS. 18A and 18B illustrate example devices that may implement the methods and teachings according to this disclosure.
Figure 18B:
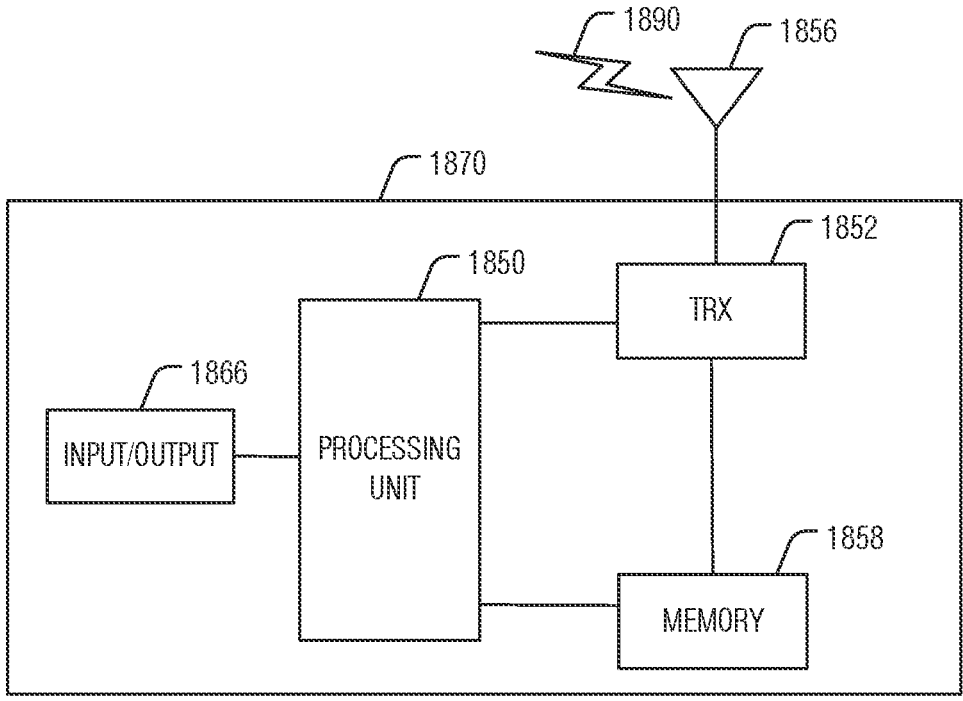

FIGS. 18A and 18B illustrate example devices that may implement the methods and teachings according to this disclosure. In particular, FIG. 18A illustrates an example ED 1810, and FIG. 18B illustrates an example base station 1870. These components could be used in the system 1700 or in any other suitable system.

As shown in FIG. 18A, the ED 1810 includes at least one processing unit 1800. The processing unit 1800 implements various processing operations of the ED 1810. For example, the processing unit 1800 could perform signal coding, data processing, power control, input or output processing, or any other functionality enabling the ED 1810 to operate in the system 1700. The processing unit 1800 also supports the methods and teachings described in more detail above. Each processing unit 1800 includes any suitable processing or computing device configured to perform one or more operations. Each processing unit 1800 could, for example, include a microprocessor, microcontroller, digital signal processor, field programmable gate array, or application specific integrated circuit.

The ED 1810 also includes at least one transceiver 1802. The transceiver 1802 is configured to modulate data or other content for transmission by at least one antenna or NIC (Network Interface Controller) 1804. The transceiver 1802 is also configured to demodulate data or other content received by the at least one antenna 1804. Each transceiver 1802 includes any suitable structure for generating signals for wireless or wired transmission or processing signals received wirelessly or by wire. Each antenna 1804 includes any suitable structure for transmitting or receiving wireless or wired signals. One or multiple transceivers 1802 could be used in the ED 1810, and one or multiple antennas 1804 could be used in the ED 1810. Although shown as a single functional unit, a transceiver 1802 could also be implemented using at least one transmitter and at least one separate receiver.

The ED 1810 further includes one or more input or output devices 1806 or interfaces (such as a wired interface to the Internet 1750). The input or output devices 1806 facilitate interaction with a user or other devices (network communications) in the network. Each input or output device 1806 includes any suitable structure for providing information to or receiving information from a user, such as a speaker, microphone, keypad, keyboard, display, or touch screen, including network interface communications.

In addition, the ED 1810 includes at least one memory 1808. The memory 1808 stores instructions and data used, generated, or collected by the ED 1810. For example, the memory 1808 could store software or firmware instructions executed by the processing unit(s) 1800 and data used to reduce or eliminate interference in incoming signals. Each memory 1808 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 18B, the base station 1870 includes at least one processing unit 1850, at least one transceiver 1852, which includes functionality for a transmitter and a receiver, one or more antennas 1856, at least one memory 1858, and one or more input or output devices or interfaces 1866. A scheduler, which would be understood by one skilled in the art, is coupled to the processing unit 1850. The scheduler could be included within or operated separately from the base station 1870. The processing unit 1850 implements various processing operations of the base station 1870, such as signal coding, data processing, power control, input or output processing, or any other functionality. The processing unit 1850 can also support the methods and teachings described in more detail above. Each processing unit 1850 includes any suitable processing or computing device configured to perform one or more operations. Each processing unit 1850 could, for example, include a microprocessor, microcontroller, digital signal processor, field programmable gate array, or application specific integrated circuit.

Each transceiver 1852 includes any suitable structure for generating signals for wireless or wired transmission to one or more EDs or other devices. Each transceiver 1852 further includes any suitable structure for processing signals received wirelessly or by wire from one or more EDs or other devices. Although shown combined as a transceiver 1852, a transmitter and a receiver could be separate components. Each antenna 1856 includes any suitable structure for transmitting or receiving wireless or wired signals. While a common antenna 1856 is shown here as being coupled to the transceiver 1852, one or more antennas 1856 could be coupled to the transceiver(s) 1852, allowing separate antennas 1856 to be coupled to the transmitter and the receiver if equipped as separate components. Each memory 1858 includes any suitable volatile or non-volatile storage and retrieval device(s). Each input or output device 1866 facilitates interaction with a user or other devices (network communications) in the network. Each input or output device 1866 includes any suitable structure for providing information to or receiving or providing information from a user, including network interface communications.

Figure 19:
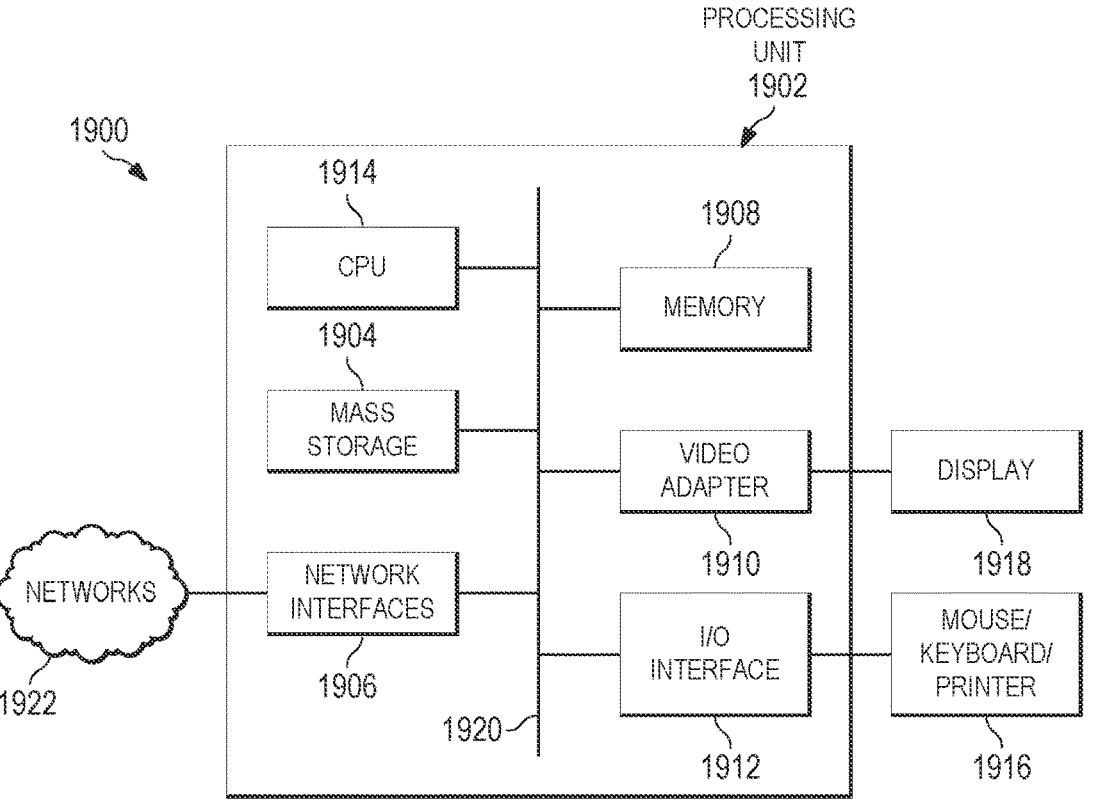
FIG. 19 is a block diagram of a computing system that may be used for implementing the devices and methods disclosed herein.

FIG. 19 is a block diagram of a computing system 1900 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1900 includes a processing unit 1902. The processing unit includes a central processing unit (CPU) 1914, memory 1908, and may further include a mass storage device 1904, a video adapter 1910, and an I/O interface 1912 connected to a bus 1920.

The bus 1920 may be one or more of any type of several bus architectures including a memory bus or memory controller, a peripheral bus, or a video bus. The CPU 1914 may comprise any type of electronic data processor. The memory 1908 may comprise any type of non-transitory system memory such as static random access memory (SRAM), dynamic random access memory (DRAM), synchronous DRAM (SDRAM), read-only memory (ROM), or a combination thereof. In an embodiment, the memory 1908 may include ROM for use at boot-up, and DRAM for program and data storage for use while executing programs.

The mass storage 1904 may comprise any type of non-transitory storage device configured to store data, programs, and other information and to make the data, programs, and other information accessible via the bus 1920. The mass storage 1904 may comprise, for example, one or more of a solid state drive, hard disk drive, a magnetic disk drive, or an optical disk drive.

The video adapter 1910 and the I/O interface 1912 provide interfaces to couple external input and output devices to the processing unit 1902. As illustrated, examples of input and output devices include a display 1918 coupled to the video adapter 1910 and a mouse, keyboard, or printer 1916 coupled to the I/O interface 1912. Other devices may be coupled to the processing unit 1902, and additional or fewer interface cards may be utilized. For example, a serial interface such as Universal Serial Bus (USB) (not shown) may be used to provide an interface for an external device.

The processing unit 1902 also includes one or more network interfaces 1906, which may comprise wired links, such as an Ethernet cable, or wireless links to access nodes or different networks. The network interfaces 1906 allow the processing unit 1902 to communicate with remote units via the networks. For example, the network interfaces 1906 may provide wireless communication via one or more transmitters or transmit antennas and one or more receivers or receive antennas. In an embodiment, the processing unit 1902 is coupled to a local-area network 1922 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

The invention claimed is:

1. A method comprising:
receiving, by a user equipment (UE), a group of power control (PC) configuration parameters using radio resource control (RRC) signaling, the group of PC configuration parameters being different from a PC adjustment state of the UE, wherein the group of PC configuration parameters is configured to be used for power control of an uplink (UL) transmission, and wherein the group of PC configuration parameters includes at least one of an open-loop power control offset parameter ($P_o$) or an open-loop power control scaling parameter (alpha);
receiving, by the UE, an indication of the PC adjustment state using downlink control information (DCI) signaling;
determining, by the UE, a transmit power level for the UL transmission in accordance with the group of PC configuration parameters, the PC adjustment state, and a pathloss estimate calculated based on a downlink (DL) signal received by the UE; and
transmitting, by the UE, the UL transmission at the transmit power level.

2. The method of claim 1, the receiving the indication of the PC adjustment state comprising:
receiving, by the UE, a configuration indicating a plurality of PC adjustment states, the plurality of PC adjustment states including the PC adjustment state, each of the plurality of PC adjustment states associated with a different closed-loop index; and
receiving, by the UE, a closed-loop index associated with the PC adjustment state.

3. The method of claim 1, further comprising:
receiving, by the UE, a configuration indicating an association of the group of PC configuration parameters, a first index of the PC adjustment state, a second index of the DL signal, and the UL transmission.

4. The method of claim 1, the UL transmission including a physical uplink shared channel (PUSCH) transmission, a physical uplink control channel (PUCCH) transmission, or a sounding reference signal (SRS) transmission.

5. The method of claim 4, the UL transmission including the PUCCH transmission, the method further comprising:
receiving, by the UE, a second group of PC configuration parameters for the PUSCH transmission, the group of PC configuration parameters for the PUCCH transmission being different from the second group of PC configuration parameters for the PUSCH transmission.

6. The method of claim 5, an open-loop PC parameter in the group of PC configuration parameters for the PUCCH transmission being different from a second open-loop PC parameter in the second group of PC configuration parameters for the PUSCH transmission, wherein the open-loop PC parameter is one of an alpha parameter or a $P_o$ parameter.

7. A user equipment (UE) comprising:
at least one processor; and
a non-transitory computer readable storage medium storing programming, the programming including instructions that, when executed by the at least one processor, cause the UE to perform operations including:
receiving a group of power control (PC) configuration parameters using radio resource control (RRC) signaling, the group of PC configuration parameters being different from a PC adjustment state of the UE, wherein the group of PC configuration parameters is configured to be used for power control of an uplink (UL) transmission, and wherein the group of PC configuration parameters includes at least one of an open-loop power control offset parameter (Po) or an open-loop power control scaling parameter (alpha);
receiving, by the UE, an indication of the PC adjustment state using downlink control information (DCI) signaling;
determining a transmit power level for the UL transmission in accordance with the group of PC configuration parameters, the PC adjustment state, and a pathloss estimate calculated based on a downlink (DL) signal received by the UE; and
transmitting the UL transmission at the transmit power level.

8. The UE of claim 7, the receiving the indication of the PC adjustment state comprising:
receiving a configuration indicating a plurality of PC adjustment states, the plurality of PC adjustment states including the PC adjustment state, each of the plurality of PC adjustment states associated with a different closed-loop index; and
receiving a closed-loop index associated with the PC adjustment state.

9. The UE of claim 7, the operations further comprising:
receiving, by the UE, a configuration indicating an association of the group of PC configuration parameters, a first index of the PC adjustment state, a second index of the DL signal, and the UL transmission.

10. The UE of claim 7, the UL transmission including a physical uplink shared channel (PUSCH) transmission, a physical uplink control channel (PUCCH) transmission, or a sounding reference signal (SRS) transmission.

11. The UE of claim 10, the UL transmission including the PUCCH transmission, the operations further comprising:
receiving, by the UE, a second group of PC configuration parameters for the PUSCH transmission, the group of PC configuration parameters for the PUCCH transmission being different from the second group of PC configuration parameters for the PUSCH transmission.

12. The UE of claim 11, an open-loop PC parameter in the group of PC configuration parameters for the PUCCH transmission being different from a second open-loop PC parameter in the second group of PC configuration parameters for the PUSCH transmission, wherein the open-loop PC parameter is one of an alpha parameter or a $P_o$ parameter.

13. A method comprising:
transmitting, by a base station, a group of power control (PC) configuration parameters using radio resource control (RRC) signaling, the group of PC configuration parameters being different from a PC adjustment state of a user equipment (UE), wherein the group of PC configuration parameters is configured to be used for power control of an uplink (UL) transmission based on the group of PC configuration parameters, the PC adjustment state, and a pathloss estimate calculated based on a downlink (DL) signal, and wherein the group of PC configuration parameters includes at least one of an open-loop power control offset parameter ($P_o$) or an open-loop power control scaling parameter (alpha);

transmitting, by the base station, an indication of the PC adjustment state using downlink control information (DCI) signaling; and receiving, by the base station, the UL transmission.

14. The method of claim 13, the transmitting the indication of the PC adjustment state comprising:

transmitting, by the base station, a configuration indicating a plurality of PC adjustment states including the PC adjustment state, each of the plurality of PC adjustment states associated with a different closed-loop index; and transmitting, by the base station, a closed-loop index associated with the PC adjustment state.

15. The method of claim 13, further comprising:

transmitting, by the base station, a configuration indicating an association of the group of PC configuration parameters, a first index of the PC adjustment state, a second index of the DL signal, and the UL transmission.

16. The method of claim 13, the UL transmission including a physical uplink shared channel (PUSCH) transmission, a physical uplink control channel (PUCCH) transmission, or a sounding reference signal (SRS) transmission.

17. The method of claim 16, the UL transmission including the PUCCH transmission, the method further comprising:

transmitting, by the base station, a second group of PC configuration parameters for the PUSCH transmission, the group of PC configuration parameters for the PUCCH transmission being different from the second group of PC configuration parameters for the PUSCH transmission.

18. The method of claim 17, an open-loop PC parameter in the group of PC configuration parameters for the PUCCH transmission being different from a second open-loop PC parameter in the second group of PC configuration parameters for the PUSCH transmission, wherein the open-loop PC parameter is one of an alpha parameter or a $P_o$ parameter.

19. A base station comprising:

at least one processor; and a non-transitory computer readable storage medium storing programming, the programming including instructions that, when executed by the at least one processor, cause the base station to perform operations including:

transmitting a group of power control (PC) configuration parameters using radio resource control (RRC) signaling, the group of PC configuration parameters being different from a PC adjustment state of a user equipment (UE), wherein the group of PC configuration parameters is configured to be used for power control of an uplink (UL) transmission based on the group of PC configuration parameters, the PC adjustment state, and a pathloss estimate calculated based on a downlink (DL) signal, and wherein the group of PC configuration parameters includes at least one of an open-loop power control offset parameter ($P_o$) or an open-loop power control scaling parameter (alpha);

transmitting, by the base station, an indication of the PC adjustment state using downlink control information (DCI) signaling; and receiving the UL transmission.

20. The base station of claim 19, the transmitting the indication of the PC adjustment state comprising:

transmitting a configuration indicating a plurality of PC adjustment states including the PC adjustment state, each of the plurality of PC adjustment states associated with a different closed-loop index; and transmitting a closed-loop index associated with the PC adjustment state.

21. The base station of claim 19, the operations further comprising:

transmitting a configuration indicating an association of the group of PC configuration parameters, a first index of the PC adjustment state, a second index of the DL signal, and the UL transmission.

22. The base station of claim 19, the UL transmission including a physical uplink shared channel (PUSCH) transmission, a physical uplink control channel (PUCCH) transmission, or a sounding reference signal (SRS) transmission.

23. The base station of claim 22, the UL transmission including the PUCCH transmission, the operations further comprising:

transmitting a second group of PC configuration parameters for the PUSCH transmission, the group of PC configuration parameters for the PUCCH transmission being different from the second group of PC configuration parameters for the PUSCH transmission.

24. The base station of claim 23, an open-loop PC parameter in the group of PC configuration parameters for the PUCCH transmission being different from a second open-loop PC parameter in the second group of PC configuration parameters for the PUSCH transmission, wherein the open-loop PC parameter is one of an alpha parameter or a $P_o$ parameter.

* * * * *